(12) United States Patent
Dhareshwar et al.

(10) Patent No.: US 12,314,722 B1
(45) Date of Patent: May 27, 2025

(54) TIER CONSOLIDATION WITH PARALLEL PROCESSING

(71) Applicant: Sage Intacct, Inc., San Jose, CA (US)

(72) Inventors: Girish Dhareshwar, Bengaluru (IN); Senthilkumar Manickam, San Jose, CA (US); Sharanabasavaraj Sunkad, Bengaluru (IN); Lijo Kurian, Bengaluru (IN)

(73) Assignee: Sage Intacct, Inc., San Jose, CA (US)

( * ) Notice: Subject to any disclaimer, the term of this patent is extended or adjusted under 35 U.S.C. 154(b) by 465 days.

(21) Appl. No.: 17/681,793

(22) Filed: Feb. 27, 2022

(51) Int. Cl.
| | |
|---|---|
| *G06F 16/22* | (2019.01) |
| *G06F 9/30* | (2018.01) |
| *G06F 9/38* | (2018.01) |
| *G06F 9/52* | (2006.01) |
| *G06F 16/23* | (2019.01) |
| *G06Q 10/067* | (2023.01) |

(52) U.S. Cl.
CPC .......... *G06F 9/3844* (2013.01); *G06F 9/3005* (2013.01); *G06F 9/526* (2013.01); *G06F 16/2246* (2019.01); *G06F 16/2343* (2019.01); *G06Q 10/067* (2013.01)

(58) Field of Classification Search
None
See application file for complete search history.

(56) References Cited

U.S. PATENT DOCUMENTS

| | | | | |
|---|---|---|---|---|
| 8,738,414 | B1 * | 5/2014 | Nagar | G06Q 10/103 |
| | | | | 705/7.12 |
| 9,135,659 | B1 * | 9/2015 | Perttunen | G06F 16/9558 |
| 2010/0287512 | A1 * | 11/2010 | Gan | G06F 16/26 |
| | | | | 715/854 |
| 2013/0054440 | A1 * | 2/2013 | Clode | G06Q 40/12 |
| | | | | 705/37 |
| 2016/0246802 | A1 * | 8/2016 | Regni | G06F 16/20 |
| 2016/0357795 | A1 * | 12/2016 | Sundstrom | G06F 16/2246 |
| 2023/0281180 | A1 * | 9/2023 | Negi | G06F 16/2343 |
| | | | | 707/797 |

* cited by examiner

*Primary Examiner* — Dawaune A Conyers
(74) *Attorney, Agent, or Firm* — Raubvogel Law Office

(57) ABSTRACT

Various embodiments described herein provide improved functionality for performing tier consolidation for organizations having any type of hierarchical structure, so as to increase flexibility, speed, accuracy, and performance in generating reports and conducting analysis on a company's operations and performance. Consolidation can be performed at any suitable time, such as for example at the end of some period, at which time it may be useful to generate accounting and/or financial reports for the organization. In at least one embodiment, the described techniques improve on conventional tier consolidation mechanisms by employing parallel processing on multiple nodes at the same level. In situations where processing of one node might interfere with processing of another node, a resource locking mechanism is used to prevent such interference, so as to ensure accuracy and avoid corruption of data.

51 Claims, 28 Drawing Sheets

| | Level | BOOKID | BOOKKEY |
|---|---|---|---|
| 1 | | BOOKID | BOOKKEY |
| 2 | 3 | FB_Holding_book | 23 |
| 3 | 2 | FB_book | 24 |
| 4 | 1 | Mark_book | 25 |
| 5 | 1 | Priscilla_book | 26 |
| 6 | 1 | Maxima_book | 27 |
| 7 | 1 | August_book | 28 |

```
1  <consolidatebytier>
2     <structurename>FB family</structurename>
3     <reportingperiodname>Month Ended January 2020</reportingperiodname>
4     <email>noreply@intacct.com</email>
5  </consolidatebytier>
```

TIER CONSOLIDATION WITH PARALLEL PROCESSING

TECHNICAL FIELD

The present document relates to techniques for consolidating nodes within an organizational chart.

BACKGROUND

Many organizations, such as real estate, hospitality, energy, distribution, and other companies or franchises, have distributed business operations that are organized as multiple business units and legal entities. In many cases, such organizations participate in any number of partnership investments to support their legal structures, and often have different holding companies that may own entities for both voting rights and financial distribution purposes. Such entities often need the ability to process multi-level tier consolidations for accurate reporting on business performance, based on a defined organizational structure that specifies hierarchical relationships among their various legal entities. In addition, the organizational structure often includes relationships that specify partial ownership, accounting for various investments in subsidiaries that cause profit and loss to flow through the organization based on its ownership structure.

An organizational chart defines hierarchical relationships among nodes within an organization such as a company or other institution. In many contexts, such an organizational chart is useful to analyze data and/or generate reports that include various combinations of nodes, particularly for multiple nodes that belong to a single substructure of the hierarchy, such as a branch within a tree structure.

Tier consolidation is the process by which multiple nodes of an organizational chart can be consolidated to a higher-tier node so that data analysis and/or report generation can be performed on an aggregate of nodes rather than on each node individually. Tier consolidation can thereby provide valuable insights into a company's operations and performance. One example of a domain in which tier consolidation can be useful is in business accounting software, where it can be useful to perform tier consolidation in the context of running accounting and financial reports.

However, existing accounting software products generally fail to perform tier consolidation in an efficient manner, particularly for complex hierarchical organizational structures having multiple interrelated tiers. As a result, tier consolidation in such existing products can be inefficient, time-consuming, and/or inflexible.

SUMMARY

Various embodiments described herein provide improved functionality for performing tier consolidation for organizations having any type of hierarchical structure, so as to increase flexibility, speed, accuracy, and performance in generating reports and conducting analysis on a company's operations and performance. Consolidation can be performed at any suitable time, such as for example at the end of some period, such as a month, quarter, or year, at which time it may be useful to generate accounting and/or financial reports for the organization.

In at least one embodiment, the described techniques improve on conventional tier consolidation mechanisms by employing parallel processing on multiple nodes at the same level. In situations where processing of one node might interfere with processing of another node, a resource locking mechanism is used to prevent such interference, so as to ensure accuracy and avoid corruption of data.

In at least one embodiment, an organizational structure is defined and can include any desired hierarchical arrangement of nodes. Tier consolidation can then be initiated for the entire structure, or at any particular node or level within the hierarchy. An automated system performs iterative tier consolidation up to the specified node or level, employing parallel processing where available and feasible. Such parallel processing improves operation of the computing system by enhancing the speed, performance, and efficiency of consolidation operations, and by making optimal use of processing power while maintaining data integrity.

First, the system scans the entire organizational structure (or a relevant subset thereof), to identify an optimal path for consolidating nodes, starting with a bottommost (leaf) node and ending with either the topmost (root) node or with a specified parent node. Once the path has been identified, tier consolidation is performed by traversing the identified path, performing consolidation on multiple nodes in parallel where such operations can be safely performed without damaging data integrity. Resource locking is performed when needed to ensure that multiple attempts to consolidate the same node do not take place concurrently.

Once the system finishes consolidation for all nodes at a given level, it posts journal entries at that level into a corresponding accounting book, and moves up the hierarchy until it reaches the point at which the tier consolidation was initiated.

The described techniques thereby allow greater efficiency and flexibility in performing tier consolidation, while ensure accuracy and data integrity.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIG. 5 is an example of a data set returned by the SQL query of FIG. 4, with levels identified for each node, according to one embodiment.

FIG. 9 is a table depicting examples of various types of circular references that can be detected by the described system.

FIG. 17 depicts an example of an Application Programming Interface (API) for triggering tier consolidation according to one embodiment.

FIGS. 18A and 18B are screen shots depicting an example of a user interface for consolidating an ownership structure according to one embodiment.

FIGS. 19A through 19D are screen shots depicting an example of a user interface for displaying and/or editing information for an organizational structure, according to one embodiment.

DETAILED DESCRIPTION OF THE EMBODIMENTS

Figure 1:
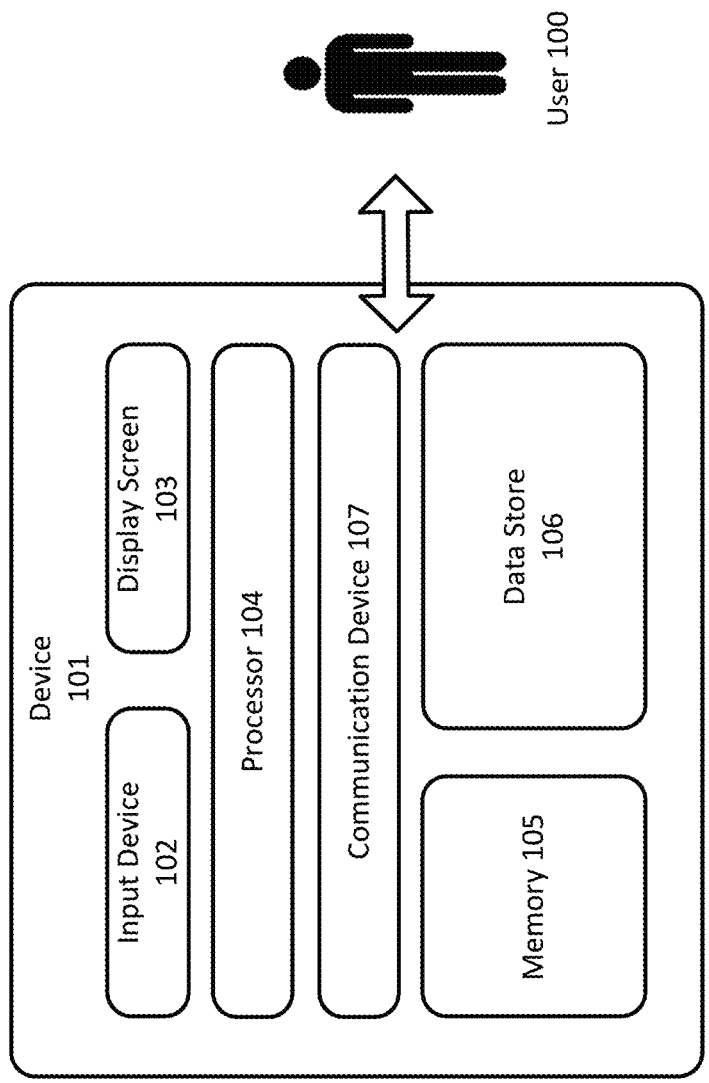
FIG. 1 is a block diagram depicting a hardware architecture for implementing the techniques described herein according to one embodiment.

The systems and methods set forth herein may be applied in many contexts in which it can be useful to perform tier consolidation for an organization. In various embodiments, the techniques described herein can be implemented in accounting software, for example, to perform tier consolidation in the context of generating accounting reports. However, the described techniques can also be used in other contexts. For example, the described techniques can be applied when generating any types of reports in connection with a business or other organization, and one skilled in the art will recognize that the described techniques can be used in many other situations as well. In addition, the particular hardware arrangements depicted and described herein are simplified examples for illustrative purposes.

In some embodiments, one or more components, as shown and described below in connection with FIGS. 1 and 2, may be used to implement the system and method described herein. In at least one embodiment, such components may be implemented in a cloud computing-based client/server architecture, using, for example, Amazon Web Services, an on-demand cloud computing platform available from Amazon.com, Inc. of Seattle, Washington. Therefore, for illustrative purposes, the system and method are described herein in the context of such an architecture. One skilled in the art will recognize, however, that the systems and methods described herein can be implemented using other architectures, such as for example a standalone computing device rather than a client/server architecture.

Further, the functions and/or method steps set forth herein may be carried out by software running on one or more of the device 101, client device(s) 108, server 110, and/or other components. This software may optionally be multi-function software that is used to retrieve, store, manipulate, and/or otherwise use data stored in data storage devices such as data store 106, and/or to carry out one or more other functions.

Definitions and Concepts

For purposes of the description herein, a "user", such as user 100 referenced herein, is an individual, enterprise, or other group, which may optionally include one or more users. A "data store", such as data store 106 referenced herein, is any device capable of digital data storage, including any known hardware for nonvolatile and/or volatile data storage. A collection of data stores 106 may form a "data storage system" that can be accessed by multiple users. A "computing device", such as device 101 and/or client device(s) 108, is any device capable of digital data processing. A "server", such as server 110, is a computing device that provides data storage, either via a local data store, or via connection to a remote data store. A "client device", such as client device 108, is an electronic device that communicates with a server, provides output to a user, and accepts input from a user.

System Architecture

According to various embodiments, the systems and methods described herein can be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the systems and methods described herein are designated as client devices, which are generally operated by end users. Other devices are designated as servers, which generally conduct back-end operations and communicate with client devices (and/or with other servers) via a communications network such as the Internet. In at least one embodiment, the techniques described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 includes a number of hardware components that are well known to those skilled in the art. Input device 102 can be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store accounting transaction data and/or other data that can be used in tracking transactions for an organization. In addition, data store 106 may store information describing relationships among various entities (nodes) within an organization; such relationships can be represented, for example, in an organizational chart having a hierarchy including any number of levels. In at least one embodiment, such data can be stored at another location, remote from device 101, and device 101 can access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. In at least one embodiment, data store 106 may be implemented using cloud-based storage architectures such as NetApp (available from NetApp, Inc. of Sunnyvale, California) and/or Google Drive (available from Google, Inc. of Mountain View, California).

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100 on display screen 103. In at least one embodiment, an identifying label is also stored along with each data entry, to be displayed along with each data entry.

Display screen 103 can be any element that displays information such as text and/or graphical elements. In particular, display screen 103 may present a user interface for viewing, configuring, selecting, and interacting with organization charts as described herein, and/or for initiating and managing tier consolidation operations. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

A communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 2:
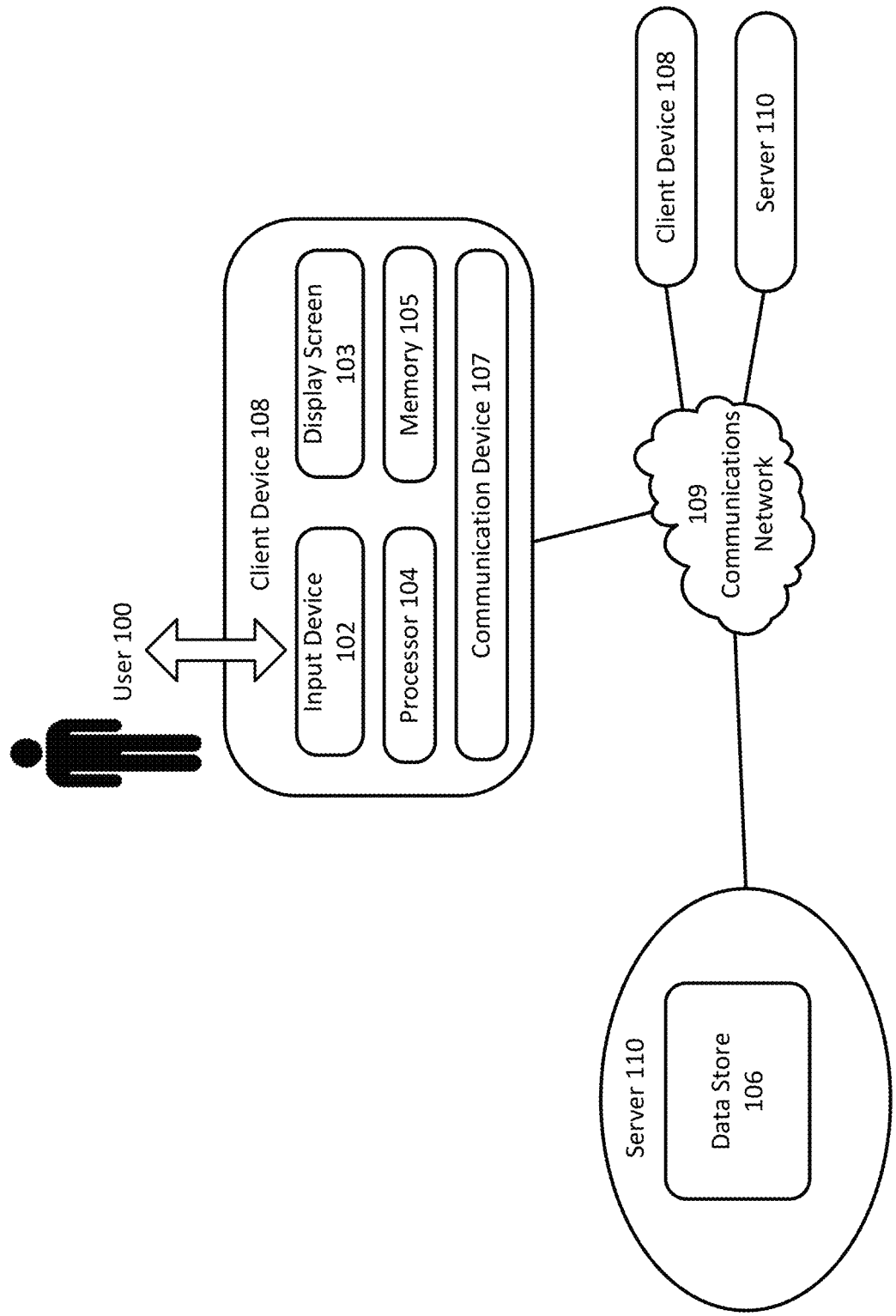
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 is responsible for data storage and processing, and incorporates data store 106. Server 110 may include additional components as needed for retrieving data from data store 106 in response to requests from client device 108.

As described above in connection with FIG. 1, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1, data store 106 may store accounting transaction data and/or other data that can be used in tracking transactions for an organization, as well as information describing relationships among various entities (nodes) within an organization; alternatively, such data can be stored elsewhere (such as at another server) and retrieved as needed.

In addition to or in the alternative to the foregoing, data may also be stored in a data store 106 that is part of client device 108. In some embodiments, such data may include elements distributed between server 110 and client device 108 and/or other computing devices in order to facilitate secure and/or effective communication between these computing devices.

As discussed above in connection with FIG. 1, display screen 103 can be any element that displays information such as text and/or graphical elements. Various user interface elements, dynamic controls, and/or the like may be used in connection with display screen 103.

As discussed above in connection with FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. A communication device 107 may communicate with other computing devices through the use of any known wired and/or wireless protocol(s), as discussed above in connection with FIG. 1.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown).

In one embodiment, some or all components of the system can be implemented in software written in any suitable computer programming language, whether in a standalone or client/server architecture. Alternatively, some or all components may be implemented and/or embedded in hardware.

Organizational Structure

In at least one embodiment, the techniques described herein can be used in any company or organization having an organizational structure of any level of complexity. Consolidation can be performed at any suitable time, such as for example at the end of some period, such as a month, quarter, or year, at which time it may be useful to generate accounting and/or financial reports for the organization. Using the consolidation techniques described herein, such reports can be generated for any entity (node) within the organization, and can include data for other nodes that are children and/or descendants of the selected node. As described in more detail herein, such consolidation is performed by traversing all the nodes in the hierarchical organizational structure, and pulling up financial numbers for each node to the layer above that node; this step is performed repeatedly up the hierarchy until reaching the topmost point from where the consolidation began. The accumulated financial numbers are then recorded as journal entries in a "book" at each node level all the way up to the top level from where the consolidation began. The report can then be output at any level as desired.

Figure 6:
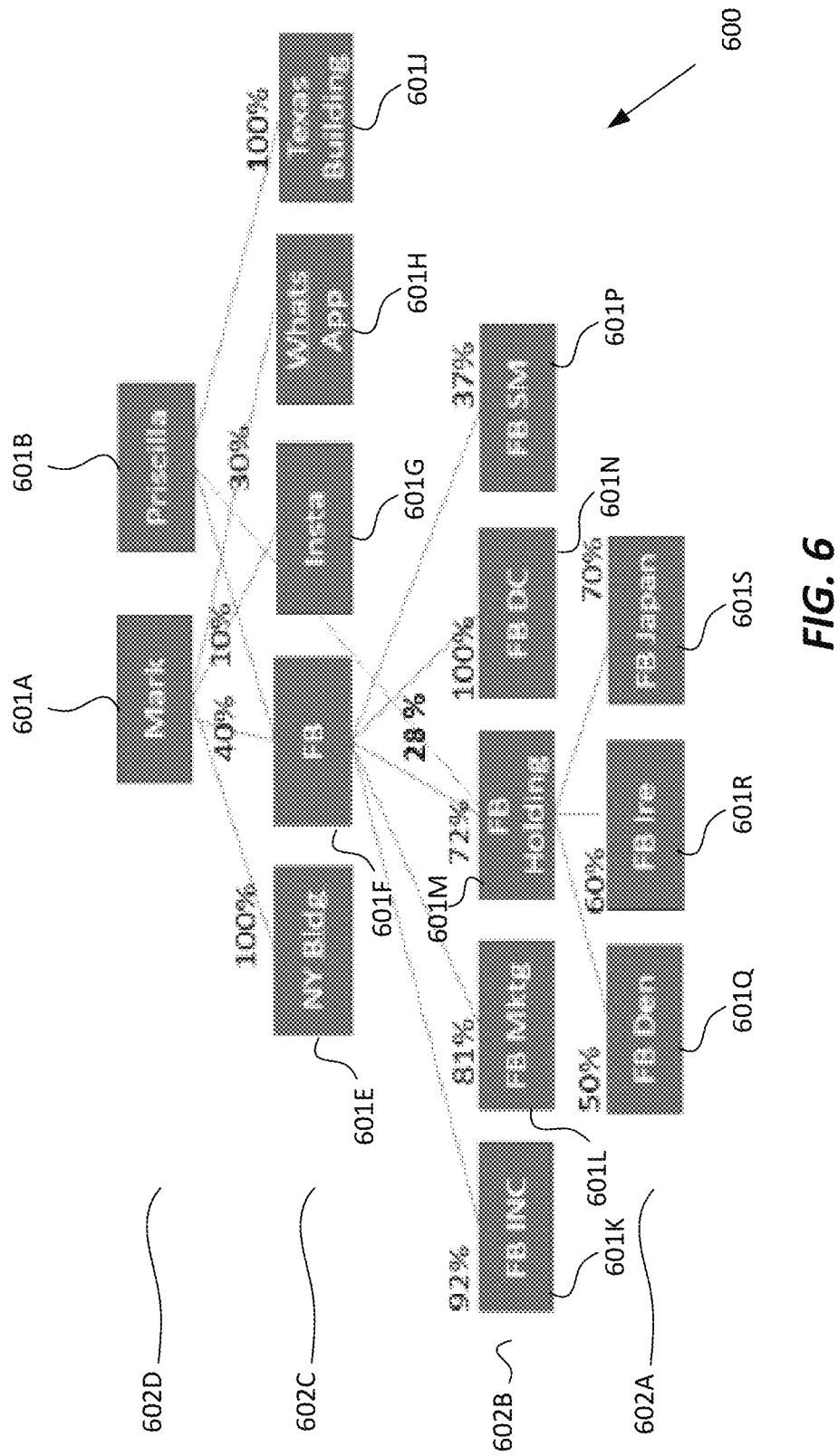
FIG. 6 is an example of an organizational structure that can be traversed using the techniques described herein.

Referring now to FIG. 6, there is shown an example of an organizational structure 600 that can be traversed using the techniques described herein. Organizational structure 600 includes a number of nodes 601. Connection lines define the relationships among nodes 601. As shown in FIG. 6, nodes 601 can be arranged in any number of levels 602. Each node 601 can be a parent of one or more node(s) 601 directly below it, and/or a child of one or more node(s) 601 directly above it. A node 601 can be a child of more than one node 601, and a node 601 can be a parent of more than one node 601. A leaf is a node 601 that has no child nodes 601.

For example, in FIG. 6:
  Nodes 601E, 601G, 601H, 601J, 601K, 601L, 601N, 601P, 601Q, 601R, and 601S are leaf nodes;
  Nodes 601E, 601F, 601G, and 601H are child nodes of node 601A;
  Nodes 601F, 601M, and 601J are child nodes of node 601B;
  Nodes 601K, 601L, 601M, 601N, and 601P are child nodes of node 601F; and
  Nodes 601Q, 601R and 601S are child nodes of node 601M.

In at least one embodiment, as shown in FIG. 6, organizational structure 600 can specify ownership percentages for each connection between one node 601 and another node 601. These reflect situations where nodes 601 can have partial ownership in one another.

Organizational structure 600 can thereby specify an ownership structure for a company or other organization, wherein different entities within the organization have various ownership relationships with one another. Thus, for example, each parent node (entity) can be defined within the ownership structure as well as any child nodes (entities) which may represent subsidiaries of one or more parent entity(ies). A parent can also be defined as a child/subsidiary.

In at least one embodiment, the ownership structure can be versioned on a period-by-period basis, so that one version of the ownership structure exists per relevant period. In this manner, consolidation processing can use the structure for the current consolidation period and subsequent periods until a change is made to the structure that results in a new version (with an effective period).

In at least one embodiment, the definition and any changes to ownership percentages can be maintained in the ownership structure. This allows user 100 to view and manage the ownership structure by period, including viewing or managing entities, relationships, and/or ownership breakdown.

Figure 7A:
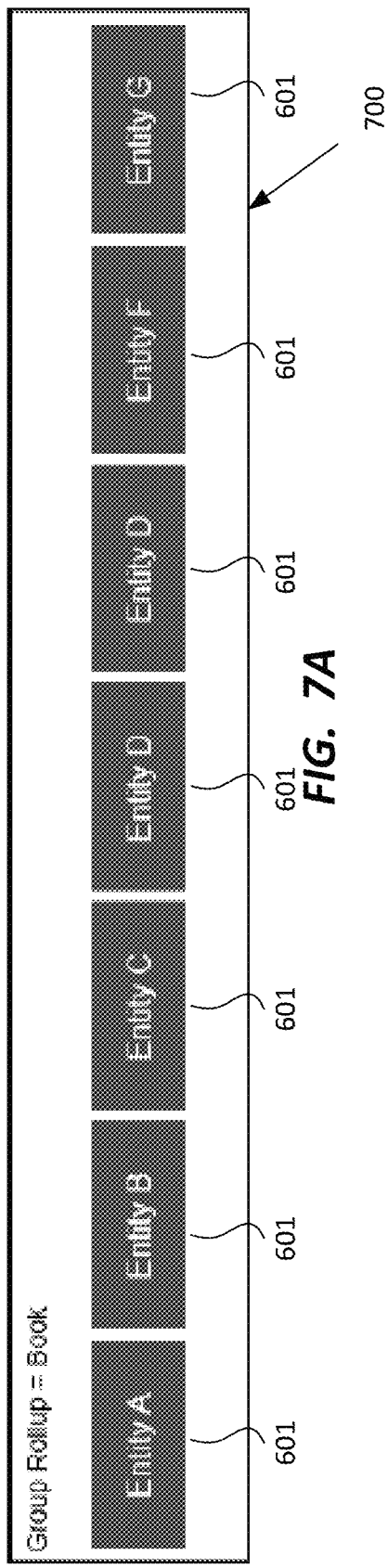
FIG. 7A is an example of a book for a single-level consolidation containing seven nodes.

Referring now to FIG. 7A, there is shown an example of a book 700 for a single-level consolidation containing seven nodes 601. Such a structure contains no hierarchical relationships, as all nodes 601 are at the same level, and there is only one reporting structure. Although single-level consolidation may still apply, there is no need for tier consolidation.

Figure 7B:
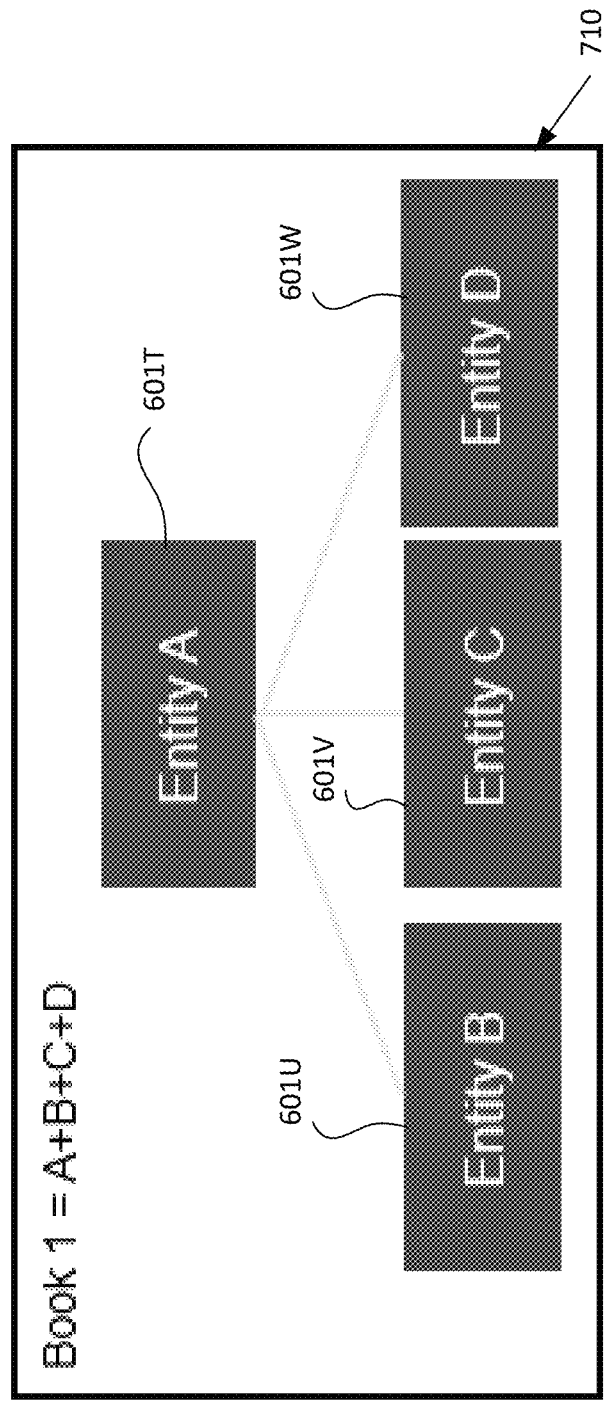
FIG. 7B is an example of a subset book defining a hierarchy among nodes.

Referring now to FIG. 7B, there is shown an example of a subset book 710 defining a hierarchy among nodes 601. Specifically, nodes 601U, 601V, and 601W are child nodes of node 601T. Subset book 710 may reflect an organizational structure for an entire organization or a portion of an organization. Consolidation for a structure such as shown in FIG. 7B is relatively straightforward, as all financial numbers for nodes 601U, 601V, and 601W can be rolled up into node 601T.

Figure 7C:
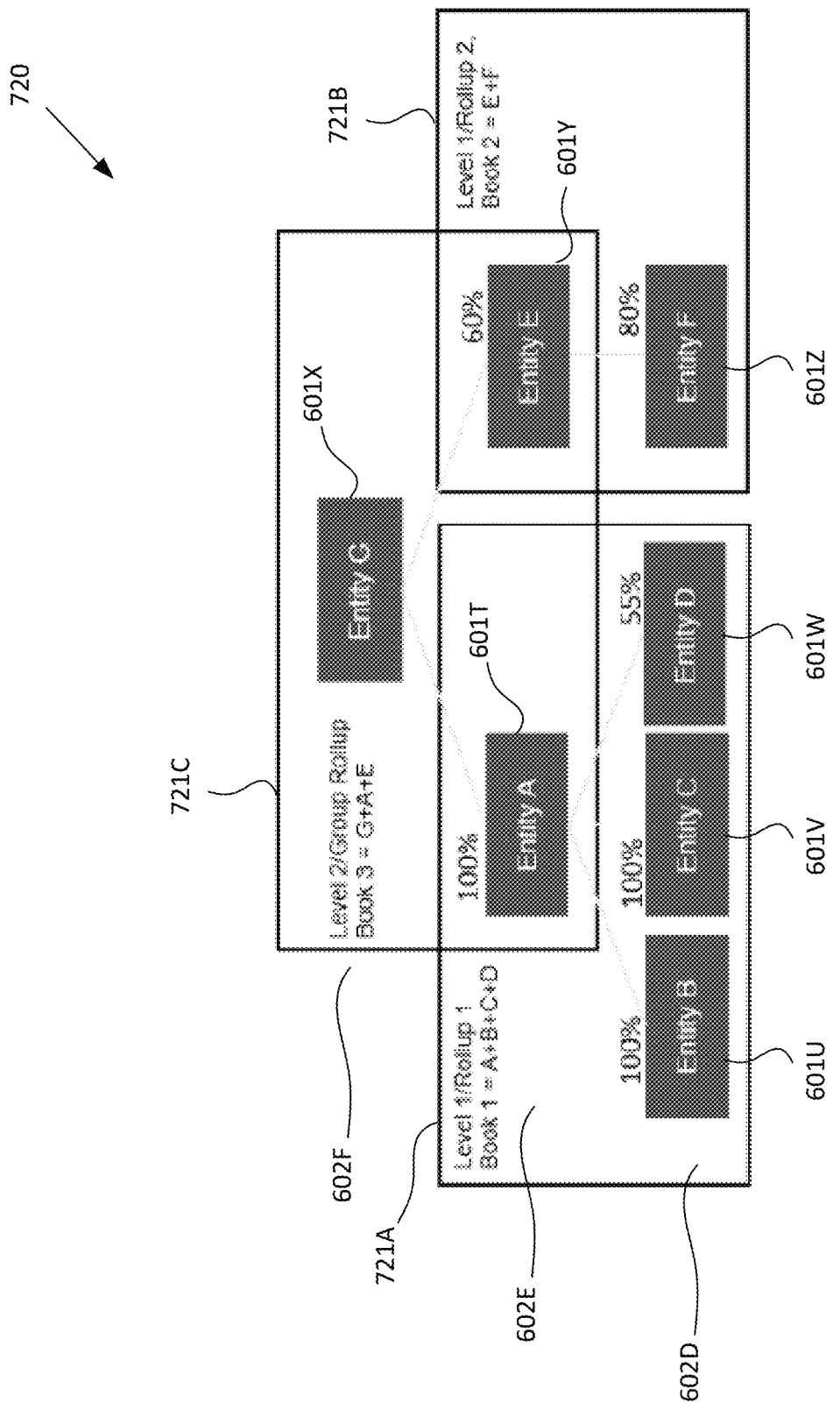
FIG. 7C is an example of a subset book defining a more complex hierarchy, in which multiple entities can be consolidated in parallel according to one embodiment.

Referring now to FIG. 7C, there is shown an example of a subset book 720 defining a more complex hierarchy. Here, nodes 601T and 601Y are child nodes of node 601X; nodes 601U, 601V, and 601W are child nodes of node 601T; and node 601Z is a child node of node 601Y. This structure defines three overlapping books 721, which in turn define three overlapping consolidation (rollup) operations: Book 721A, which is generated/updated by consolidating nodes 601U, 601V, and 601W into node 601T; Book 721B, which is generated/updated by consolidating node 601Z into node 601Y; and Book 721C, which is generated/updated by consolidating nodes 601T and 601Y into node 601X. Since nodes 601T and 601Y are at the same level, consolidation for these two nodes can take place in parallel, i.e., simultaneously. Once consolidation for nodes 601T and 601Y is complete, the results can be consolidated (rolled up) into node 601X. The system described herein performs such consolidations in an efficient manner, by enabling parallel processing of consolidation when possible, while maintaining data integrity and triggering subsequent consolidation of higher levels once the lower level consolidations are complete.

In FIG. 7C, the two parallel consolidations of nodes 601T and 601Y, corresponding to books 721A and 721B, respectively, are labeled as "Level 1/Rollup 1/Book 1" and "Level 1/Rollup 2/Book 2," respectively. The subsequent consolidation of node 601X, corresponding to book 721C, is labeled as "Level 2/Group Rollup/Book 3."

Figure 7D:
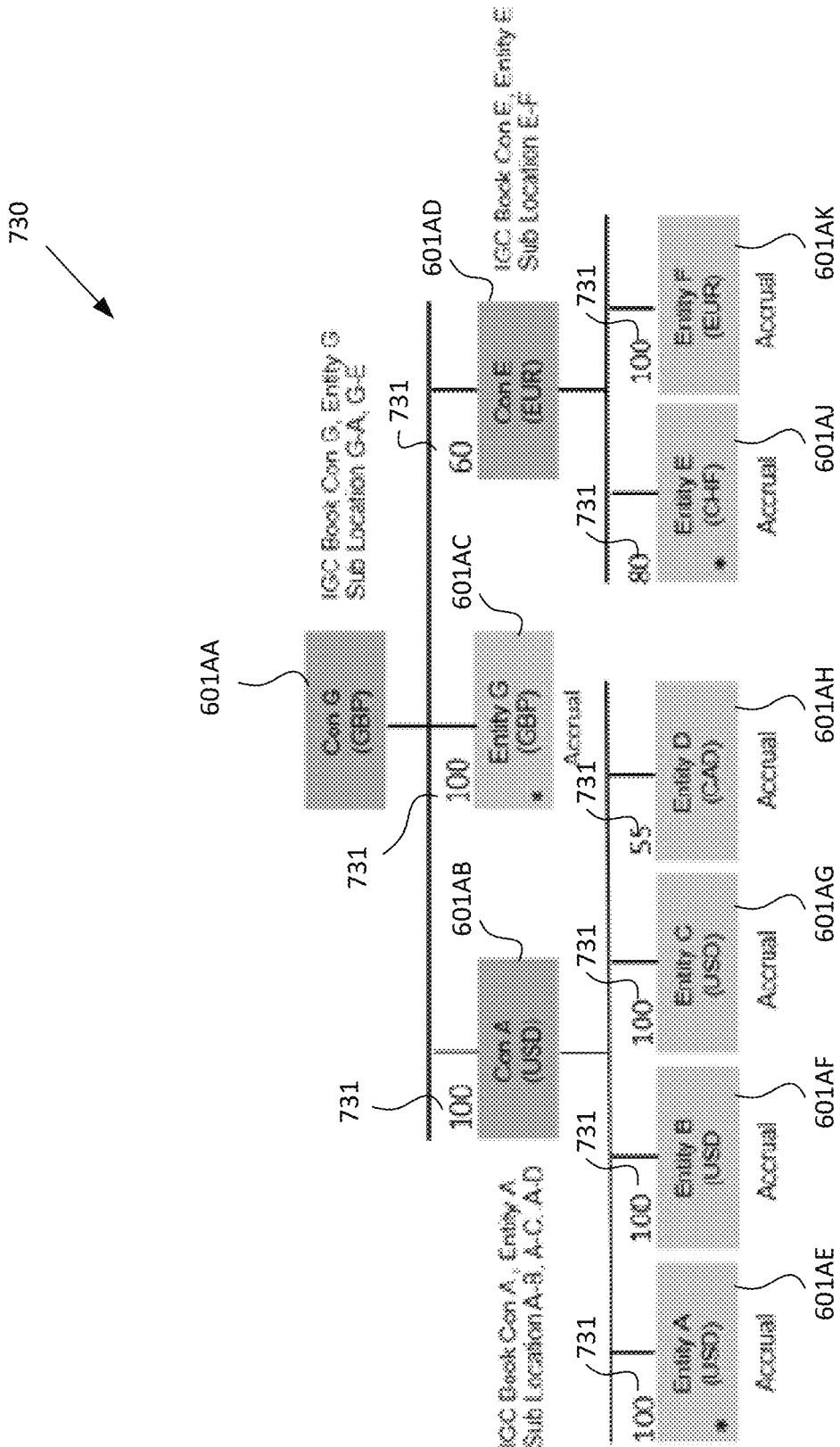
FIG. 7D is an example of an organizational structure that depicts partial ownership that can be used as the basis for equity consolidations.

More complex organizational structures can also be provided. Referring now to FIG. 7D, there is shown an example of an organizational structure 730 that depicts partial ownership that can be used as the basis for equity consolidations. In organizational structure 730, various nodes 601 are associated with different currencies, and relationships among nodes 601 are specified by ownership percentages 731. For example, node 601AA has 100% ownership of child nodes 601AB and 601AC, and has 60% ownership of child node 601AD.

In addition, the various nodes 601 of organizational structure 730 use different currencies: nodes 601AA and 601AC use British pounds, nodes 601AD and 601AK use euros, node 601AH uses Canadian dollars, node 601AJ uses Swiss francs, and nodes 601AB, 601AE, 601AF, and 601AG use US dollars. In such situations where a node 601 that uses one currency is being rolled up into a node 601 that uses a different currency, automatic currency conversion is used during consolidation, based on appropriate exchange rates for the period of the consolidation.

In the example of FIG. 7D, node 601AB is labeled "Con A", indicating that it is generated by consolidating nodes 601AE, 601AF, 601AG, and 601AH; automatic currency conversion is performed for node 601AH from Canadian dollars to US dollars. Node 601AD is labeled "Con E", indicating that it is generated by consolidating nodes 601AJ and 601AK; automatic currency conversion is performed for node 601AJ from Swiss francs to euros. In at least one embodiment, using the methods described herein, consolidation of nodes 601AH and 601AD is performed in parallel, since both of these nodes are at the same level of structure 730. Finally, once consolidation of nodes 601AH and 601AD has been completed, node 601AA (labeled "Con G") is generated by consolidating nodes 601AB, 601AC, and 601AD; automatic currency conversion is performed for node 601AB from US dollars to British pounds and for node 601AD from euros to British pounds. In all cases, currency conversion is performed automatically, based on appropriate exchange rates for the period of the consolidation.

Figure 7E:
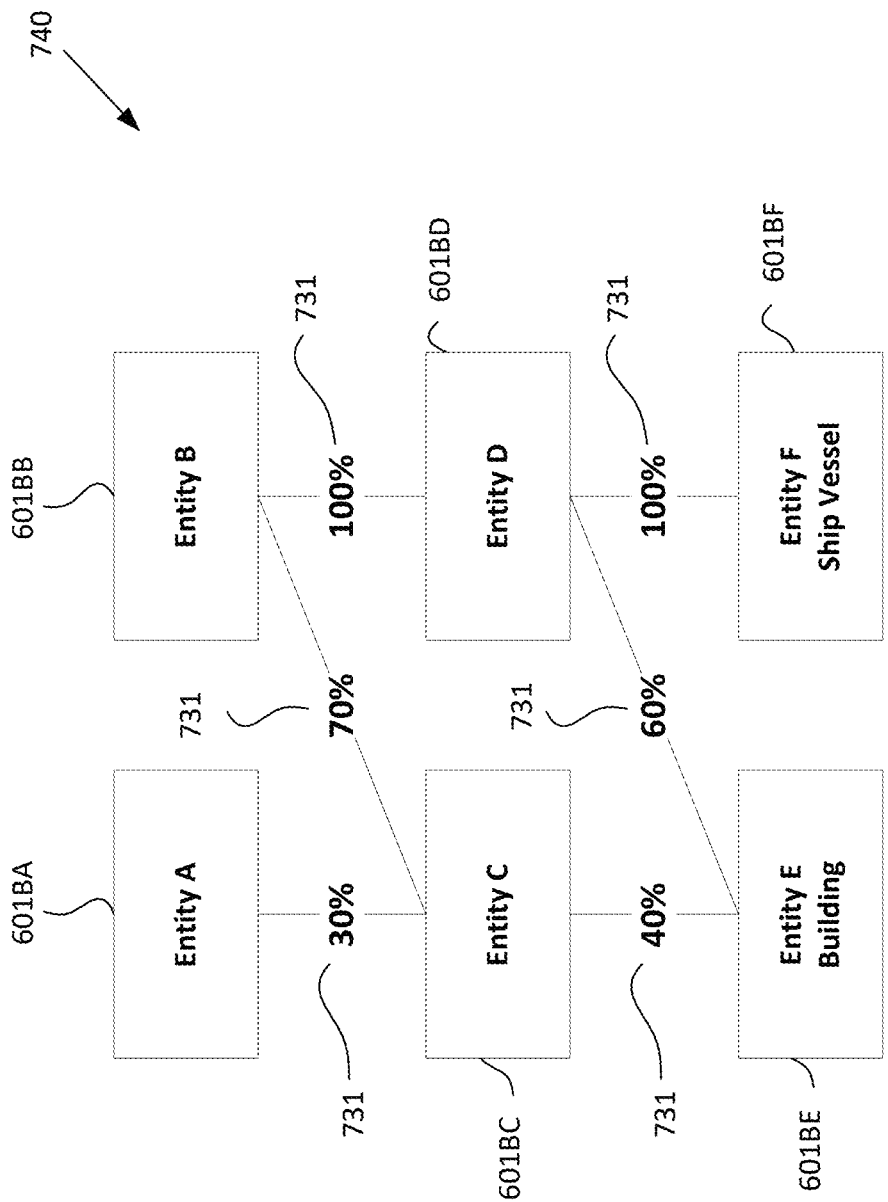
FIG. 7E is an example of an organizational structure that depicts partial ownership that can be used as the basis for proportional consolidations, wherein the same entity can be used for multiple rollups.

Referring now to FIG. 7E, there is shown an example of an organizational structure 740 that depicts partial ownership that can be used as the basis for proportional consolidations, wherein the same entity can be used for multiple rollups, because at least one node 601 may have multiple parents. Again, ownership percentages 731 are shown. In this example, node 601BC has two parents (nodes 601BA and 601BB), with proportions indicated for each. Similarly, node 601BE has two parents (nodes 601BC and 601BD), with proportions indicated for each. Accordingly, nodes such as 601BC and 601BE would each be part of two separate consolidations. The techniques provided herein ensure that data integrity is preserved when multiple processes attempt to affect the same node 601.

Tier Consolidation Method

Figure 3A:
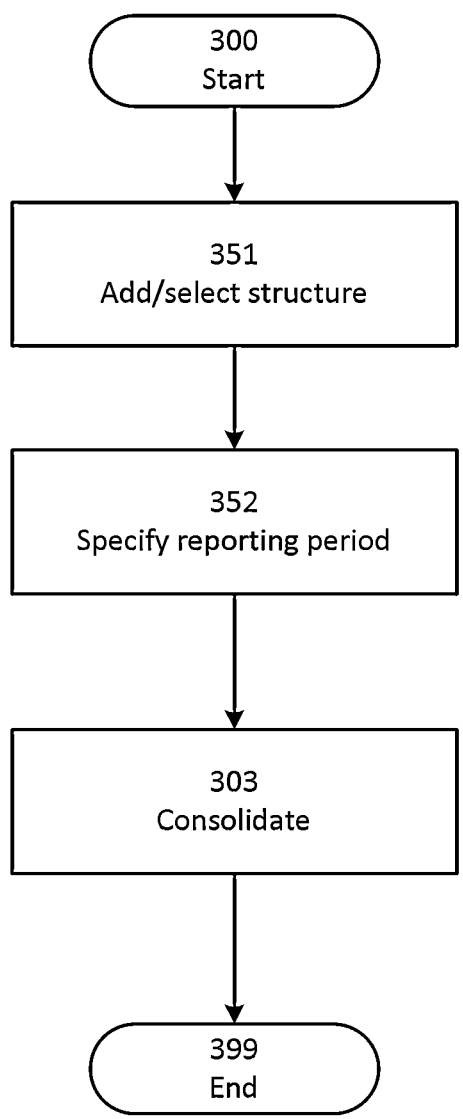
FIG. 3A is a flow diagram depicting an overall method for performing tier consolidation according to one embodiment.

Referring now to FIG. 3A, there is shown a flow diagram depicting an overall method for performing tier consolidation, according to one embodiment. In at least one embodiment, the method depicted in FIG. 3A is performed by electronic components such as those depicted and described above in connection with FIGS. 1 and/or 2. For example, the method may be performed by software running on processor 104, using input from input device 102 and presenting output on display screen 103. One skilled in the art will recognize that the method of FIG. 3A can also be performed using other hardware architectures.

The method begins 300. User 100 adds or selects 351 an organizational structure or portion thereof, either by selecting among predefined structures, or generating a new structure. Step 351 may include specifying a particular portion of an organization's structure, such as for example a certain tier, level, node 601, department, or geographic region that user 100 is interested in. Any suitable user interface can be provided for allowing user 100 to make this selection; for example, user 100 can click on a particular node 601 or set of nodes 601 within an organizational structure, so as to initiate consolidations for all child nodes 601 of the selected node 601.

Figure 18A:
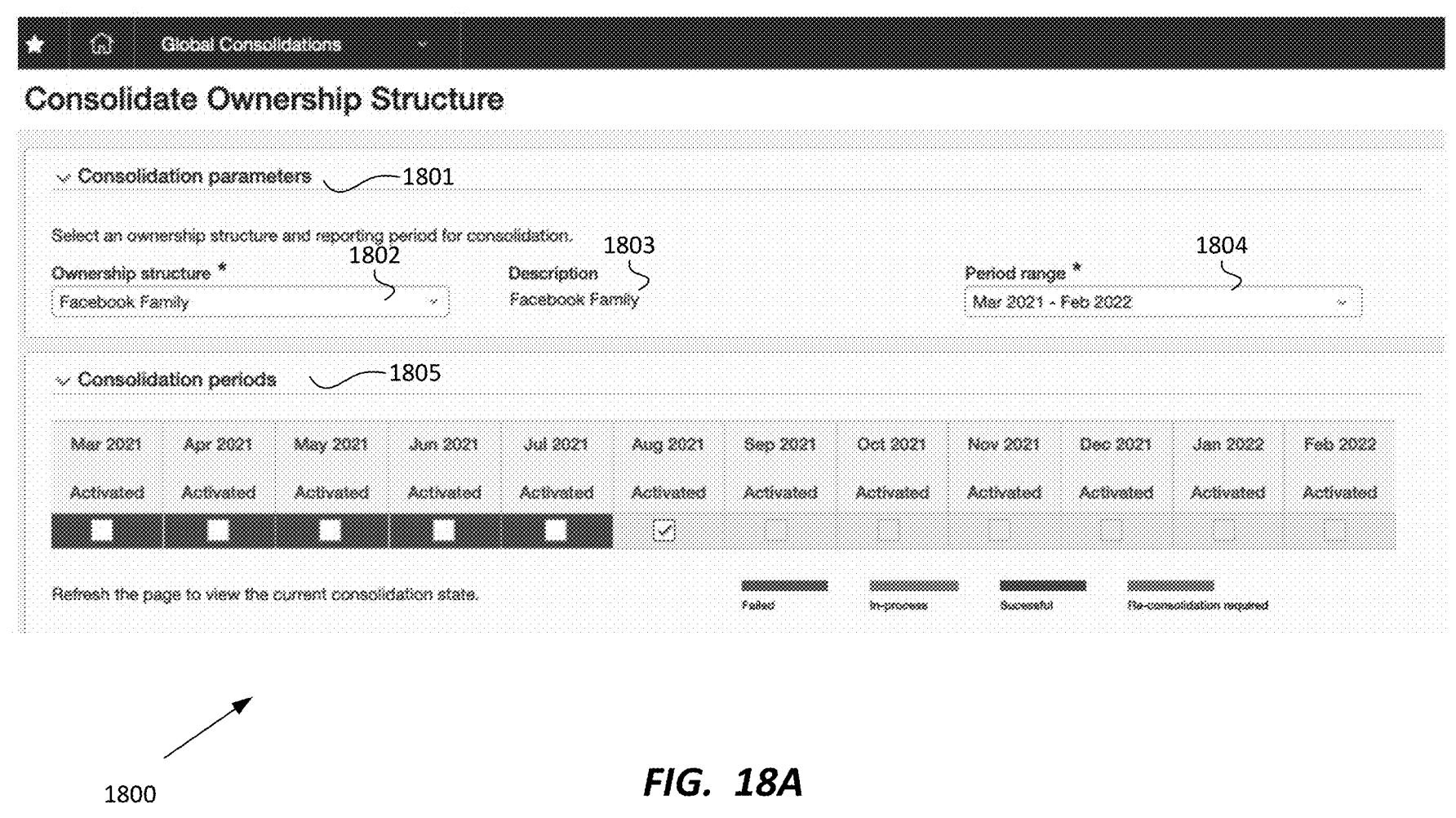
Figure 18B:
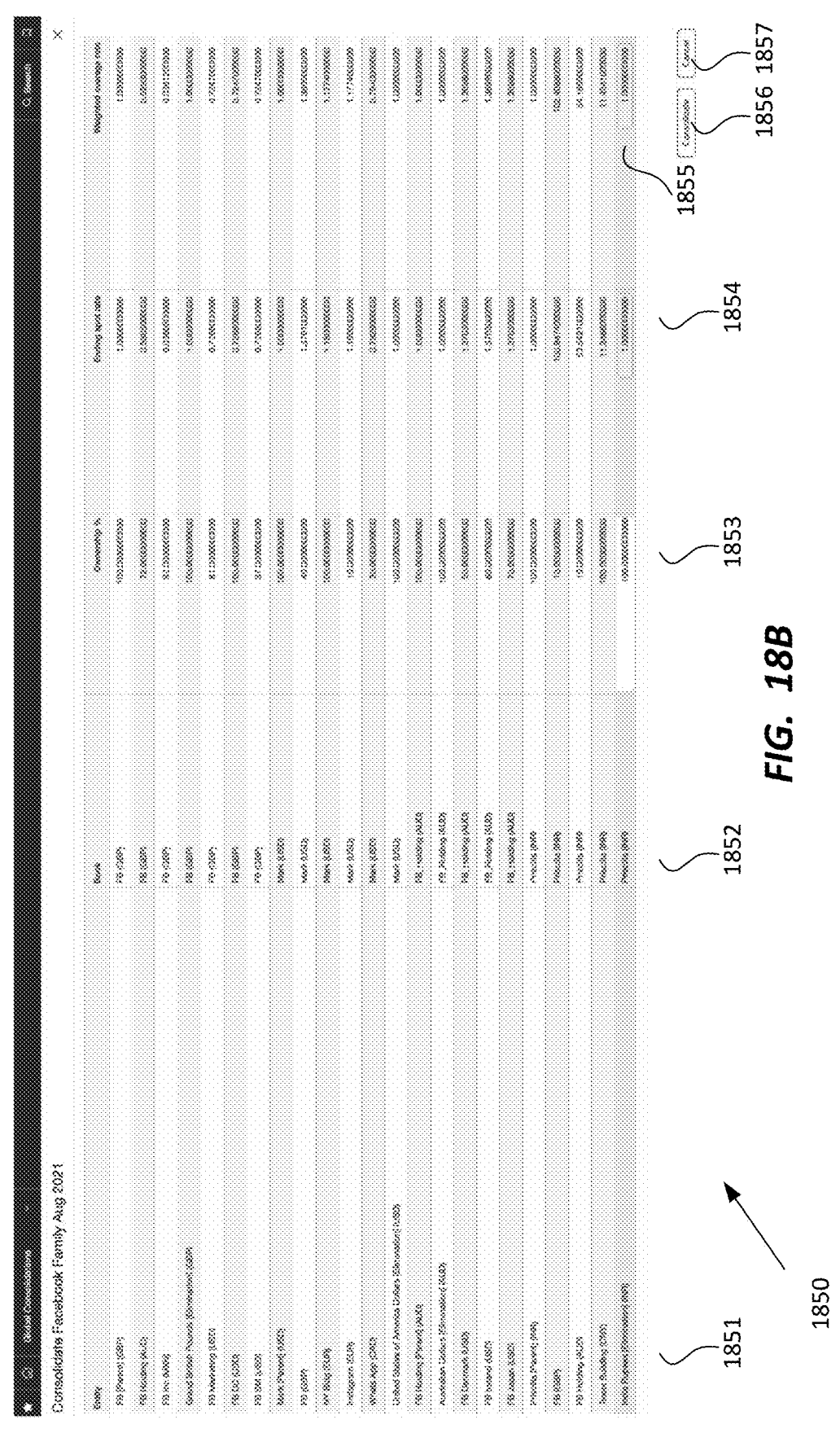

Referring now to FIGS. 18A and 18B, there are shown screen shots depicting an example of a user interface for consolidating an ownership structure according to one embodiment. FIG. 18A depicts screen 1800, including section 1801 for specifying consolidation parameters, including selection of an ownership structure from menu 1802, a description 1803, and a period range from menu 1804. Section 1805 allows user 100 to specify consolidation periods, and to view the current consolidation state (e.g., failed, in-process, successful, or reconsolidation required).

FIG. 18B depicts screen 1850, including a detailed list of consolidation information for entities within a family. This includes, for example, entity name 1851, book 1852, ownership percentage 1853, ending spot rate 1854, and weighted average rate 1855. Button 1856 begins the consolidation process, and button 1857 cancels it.

User 100 specifies 352 a reporting time period, such as for example a year, a quarter, a month, or the like. In at least one embodiment, the time period is always a month. In at least one embodiment, user 100 can provide this input by selecting from a pull-down menu, or entering custom dates in one or more fields. In general, user 100 may specify a time period in which he or she is interested, for generating reports.

User 100 initiates consolidation 303, for example by clicking on a button or link, or otherwise issuing a command to initiate the consolidation process as described herein. In at least one embodiment, step 303 may be performed automatically. In at least one embodiment, step 303 involves traversing the entire organizational structure, identifying the best path to start with, and traversing from the bottommost leaf node 601 in the selected structure to the selected node 601. As described in more detail herein, as the system finishes consolidation for all nodes 601 at a given level, it posts journal entries for that level into the respective accounting book, and moves up the hierarchy until it reaches the selected node 601 (i.e., the point at which the tier consolidation was initiated). Further details on consolidation step 303 are described herein.

The method then ends 399.

Figure 14:
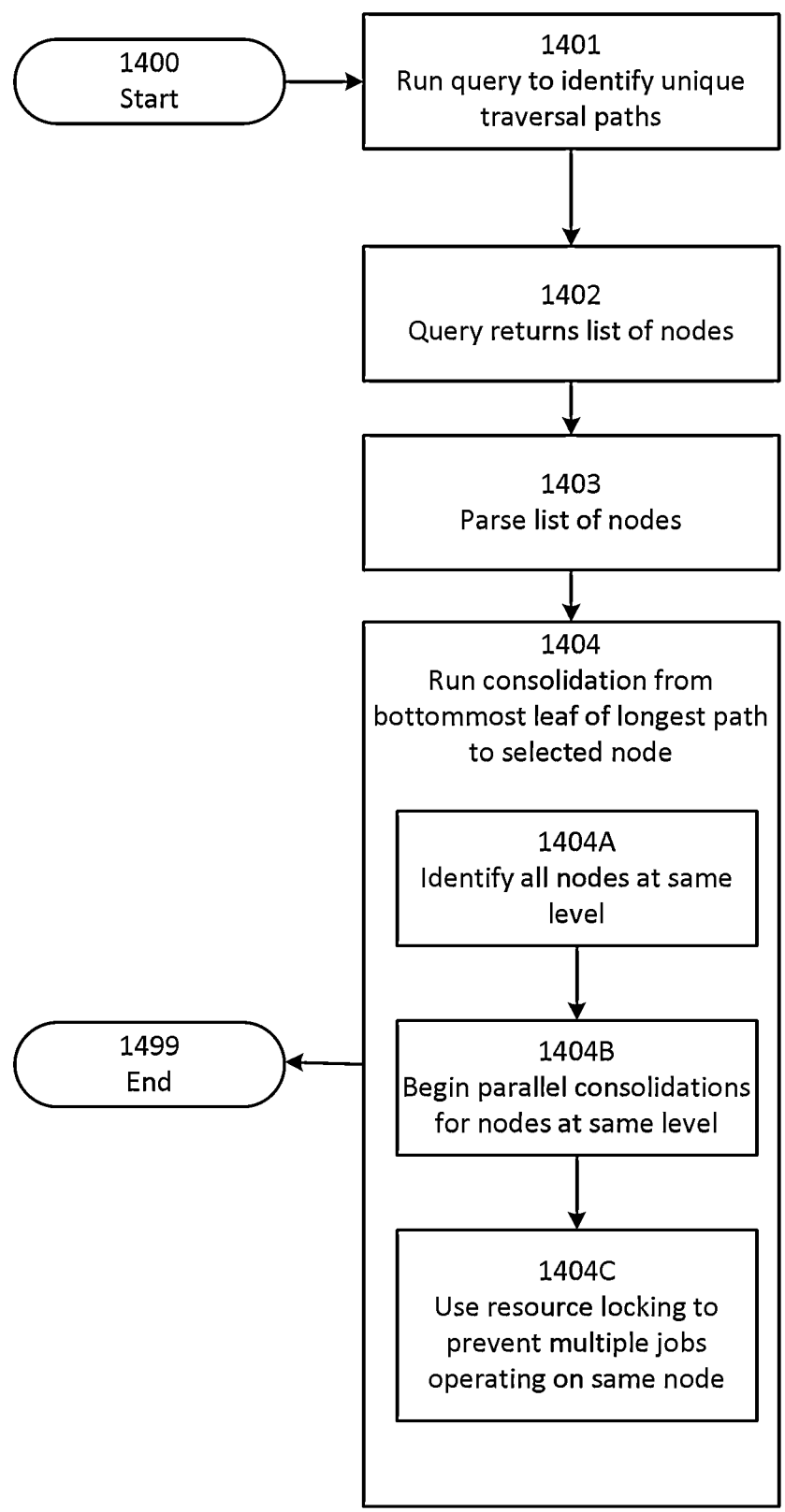
FIG. 14 is a flow diagram depicting further details for performing tier consolidation, according to one embodiment.

Referring now to FIG. 14, there is shown a flow diagram detailing further details for performing consolidation step 303 according to one embodiment.

The method begins 1400. In at least one embodiment, a query is run 1401, using a query language such as SQL, to identify all unique paths for traversing the hierarchy of the organizational structure, including visiting all levels starting from the bottommost leaf under the selected node 601, and proceeding up the hierarchy, one level at a time, until the selected node 601 itself is reached.

Figure 4:
FIG. 4 is an example of an SQL query for identifying an optimal tier consolidation path through a hierarchy of nodes, according to one embodiment.

Referring now also to FIG. 4, there is shown an example of an SQL query 400 as can be used in step 1401 for identifying an optimal tier consolidation path through a hierarchy of nodes in an organizational structure, according to one embodiment.

Query 400 returns 1402 a list of nodes 601 at each level along the identified path. In at least one embodiment, nodes 601 are sorted with the highest level first, which indicates the longest hierarchical path. In at least one embodiment, in processing query 400, the system traverses nodes 601 using every possible path, so as to identify the optimal path. Query 400 then returns a list of levels and nodes 601, sorted with the highest level first. The longest path corresponds to the path in which traversal begins with the bottommost leaf and proceeds to the top of the hierarchy.

Referring now also to FIG. 5, there is shown an example of a data set 500 returned in step 1402 by SQL query 400 of FIG. 4. A number of nodes 601 are identified by alphanumeric identifiers 501. For each node 601, in addition to alphanumeric identifier 501, the corresponding level 502 in the hierarchy is shown, and a numeric identifier 503 (denoted "BOOKKEY") is provided for the associated consolidation book.

Next, the system parses 1403 the list of nodes 601 in the data set returned in step 1402, and starts running consolidation 1404 from the bottommost leaf of the longest path in the data set. Consolidation step 1404 includes gathering financial numbers for a node 601, and moving to the layer above. This process is repeated in a loop as the system moves one level up at a time, until the selected node 601 (i.e., the point at which the tier consolidation was initiated) is reached.

In at least one embodiment, the system achieves improved performance by intelligently performing step 1404 in parallel for multiple nodes 601 at the same level. In order to do so, the system identifies 1404A all nodes 601 that are at the same level as one another. For each level having two or more nodes 601, the system begins 1404B performing parallel consolidations for all nodes 601 at that same level. By performing consolidations in parallel, the system improves the efficiency of tier consolidation.

In at least one embodiment, while performing step 1404B, the system runs parallel processing logic that includes a tracker which keeps track of the last running consolidation in each level, and is responsible for creating a set of consolidation jobs for the next level above. Such parallel processing improves operation of the computing system by enhancing the speed, performance, and efficiency of consolidation operations, and by making optimal use of processing power while maintaining data integrity.

In at least one embodiment, parallel processing logic uses 1404C a resource locking mechanism to prevent any possibility of multiple jobs initiating the consolidation for a particular level at the same time. The resource locking mechanism thus ensures that any particular node 601 (or level) is not being updated by more than one process at any given time. In at least one embodiment, this resource locking mechanism includes a counter for each node 601.

In at least one embodiment, for each level of the consolidation, a counter value is set to equal the count of books at that same level that are subject to consolidation. For example, referring again to the example of FIG. 7D, one level contains nodes 601AB and 601AD, which are both subject to consolidation (node 601AC, which is at the same level, is a leaf node that is not subject to consolidation). Thus, the count is set to two, and parallel processing proceeds for the two books corresponding to nodes 601AB and 601AD. When one of these consolidation processes is completed, the counter is decremented, for example using a PL/SQL block using PRAGMA AUTONOMOUS_TRANSACTION (to prevent the second parallel process decrementing the counter at the same time). Completion of the last book at a given level causes the counter value to be decremented to zero, which initiates the next set of consolidation jobs for the next level above the current level. In this manner, the system ensures that only the last running consolidation for a given level owns the responsibility of creating the next roll-up consolidation jobs, thus preventing data corruption.

The resource locking mechanism avoids a situation where a node 601 might otherwise be updated by more than one process simultaneously.

More specifically, in at least one embodiment, before parallel jobs are initiated, the parallel jobs are recorded in a table, along with the structure key and a count of jobs that can be run in parallel for a given level. Whenever a consolidation job completes execution, the count is decremented so as to keep track of the number of parallel jobs still running at a given level.

In addition, in at least one embodiment, a lock (such as, for example, a Memcache lock) is implemented on the organizational structure while consolidation is taking place, so as to ensure that, at any given point in time, only one overall consolidation process is being run on the organization structure as a whole, so as to avoid data corruption (duplicating) of posting consolidation numbers.

Once step 1404 has been performed, the method ends 1499.

As discussed in more detail below, the described system and method are able to traverse organizational structures having complex hierarchies, and can perform consolidation for an entire organizational structure or any suitable portion thereof. Such operations can be performed in an efficient manner using the parallel processing techniques described herein, wherein multiple nodes 601 at the same level of a hierarchy can be processed simultaneously. Resource locking ensures that, even in a complex hierarchy, only one process operates on any given node 601 in the structure, so that data is not corrupted.

Figure 3B:
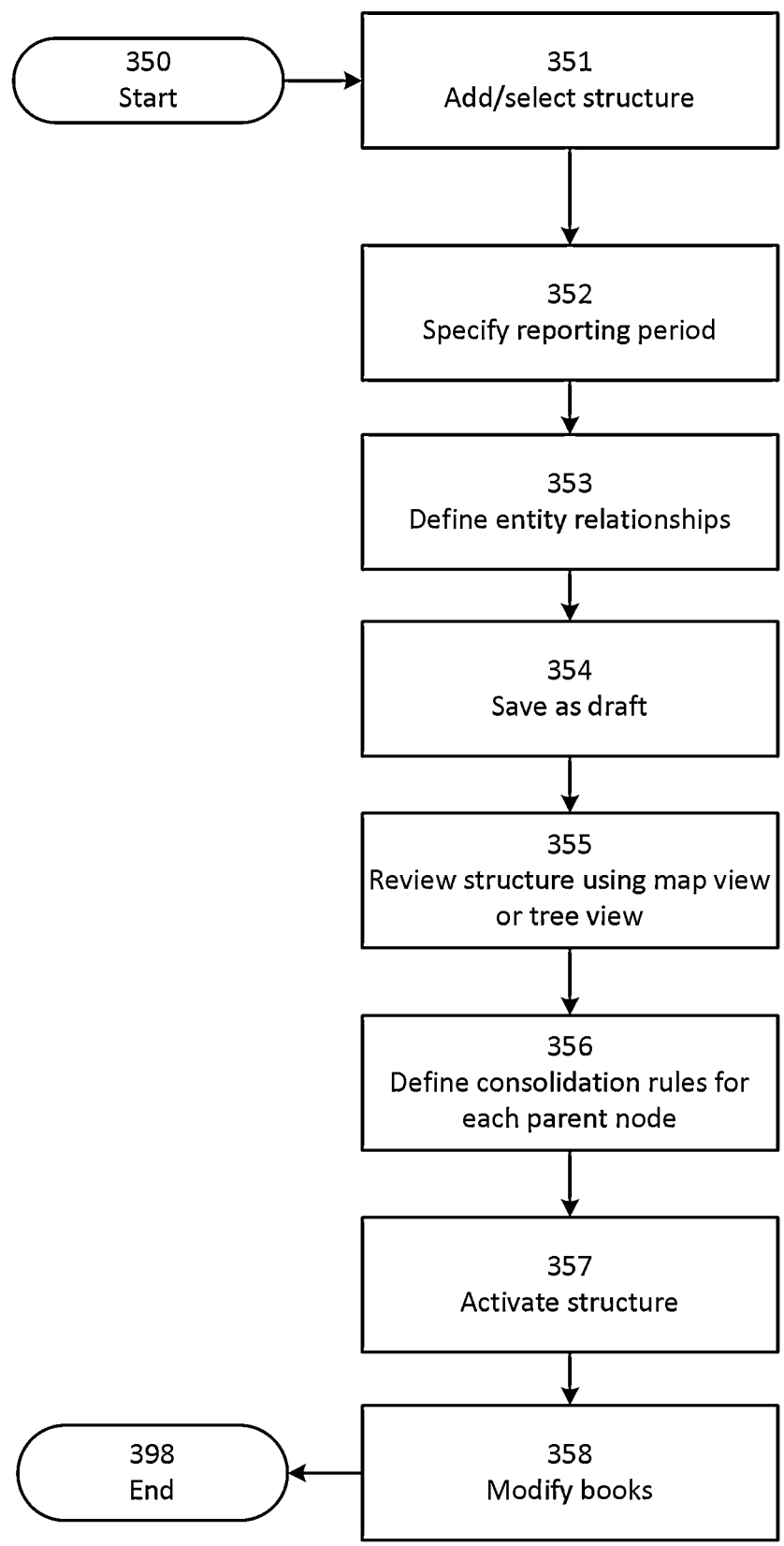
FIG. 3B is a flow diagram depicting further details of a method for performing tier consolidation according to one embodiment.

Referring now to FIG. 3B, there is shown a flow diagram depicting more details of a method for performing tier consolidation according to one embodiment.

Figure 19A:
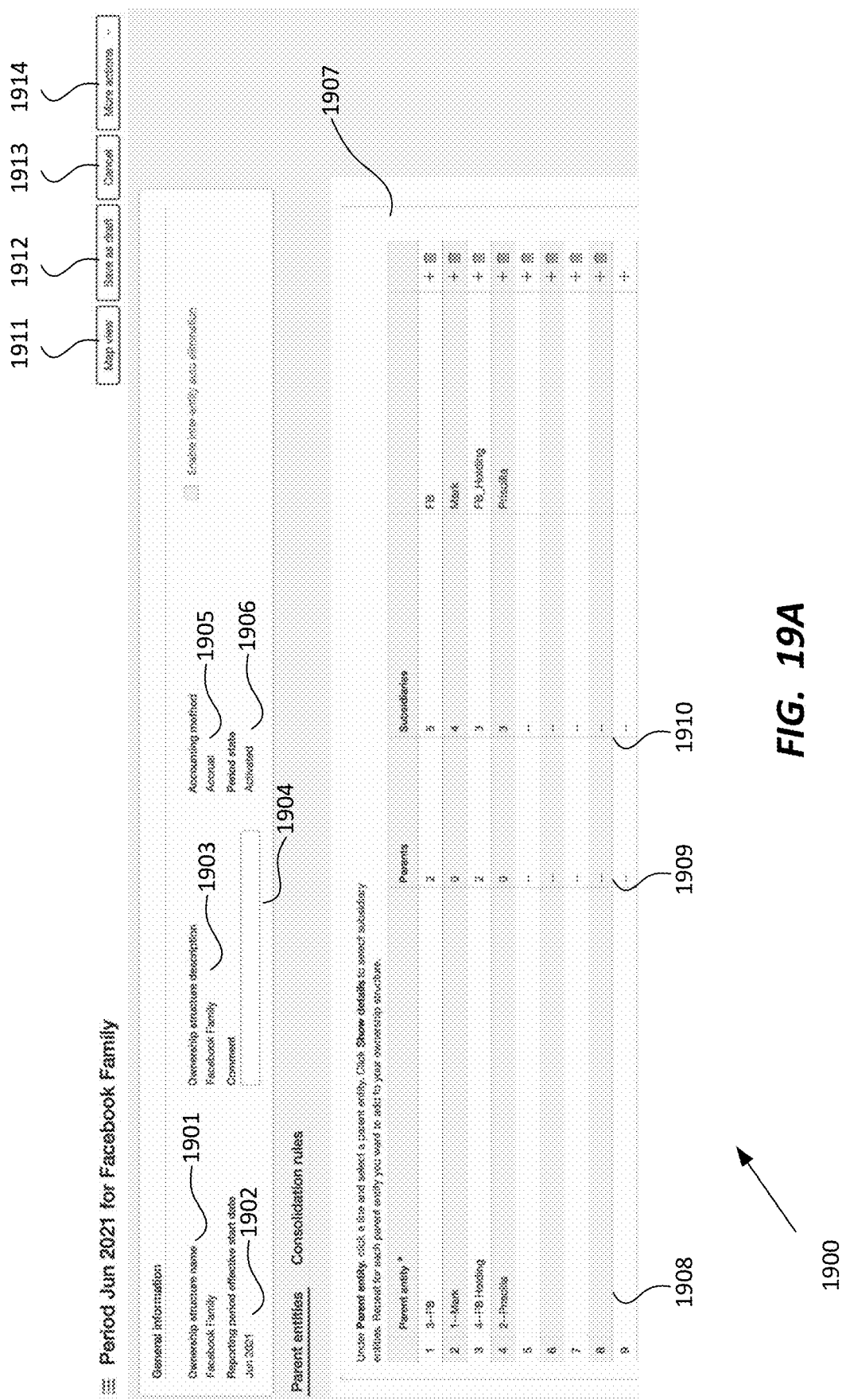
Figure 20:
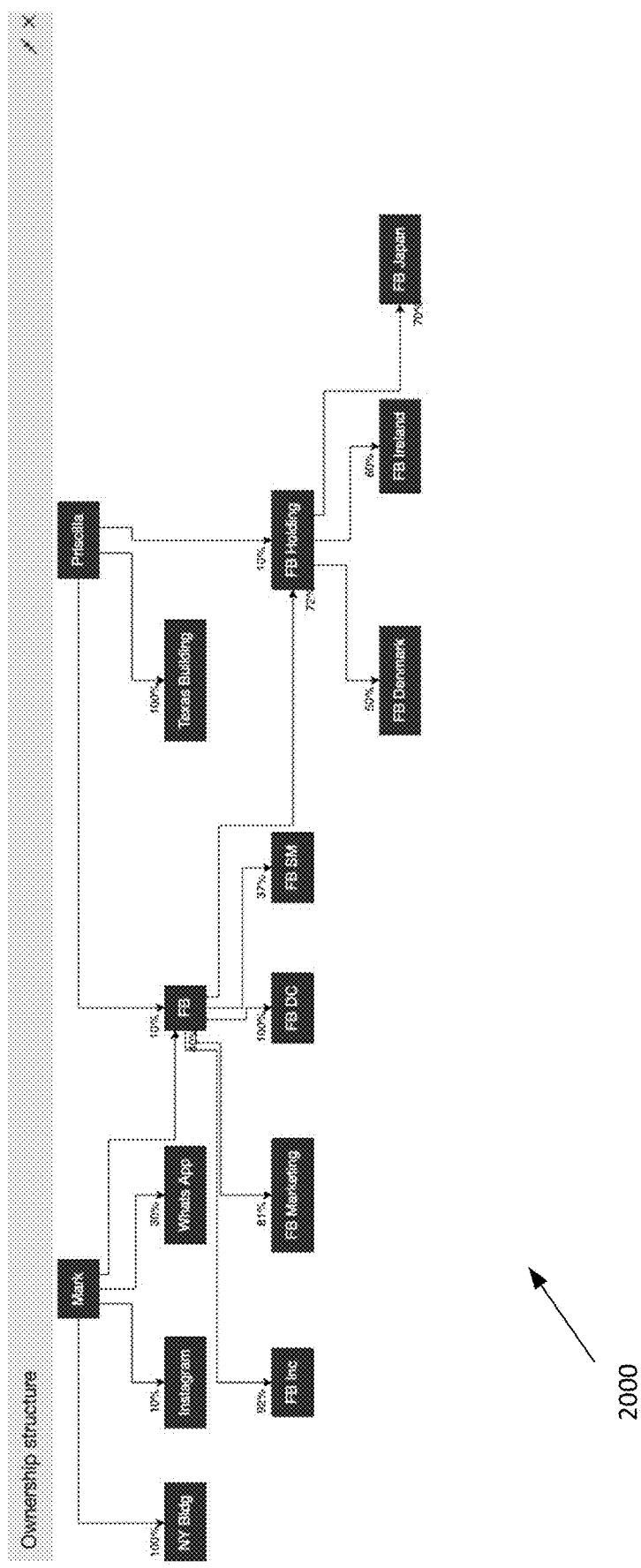
FIG. 20 is a screen shot depicting an example of a user interface for displaying a map view of an organizational structure, according to one embodiment.

The method begins 350. An organizational structure is added or selected 851; this can include defining any or all of a name, description, accounting method, comment and/or status for the structure, and specifying whether automatic eliminations are enabled for the structure. Referring now to FIG. 19A, there is shown a screen shot depicting an example of a user interface 1900 for displaying and/or editing information for an organizational structure, according to one embodiment. The example includes ownership structure name 1901, reporting period effective start date 1902, ownership structure description 1903, comment field 1904, accounting method 1905, and period state 1906. Also shown is a list 1907 of parent entities, including name 1908, number of parents 1909, and number of subsidiaries (child nodes) 1910. Button 1911 activates a map view, as depicted in FIG. 20. Button 1912 saves the organizational structure as a draft. Button 1913 cancels the operation. Button 1914 provides access to additional actions.

Next, a reporting period, including an effective start date, is specified 352 for the structure. The reporting period may be specified based on user input.

Next, relationships among nodes 601 of the organizational structure are defined 353. The entity relationships may be specified based on user input, or they may inherit the structure from the prior period. In at least one embodiment, step 353 is performed by selecting each parent node 601, selecting child nodes 601 for each parent node 601 (thus defining entity relationships), and specifying an ownership percentage if applicable. In at least one embodiment, if no ownership percentage is specified, the system defaults to 100% ownership.

In at least one embodiment, step 353 includes defining any or all of the following:

Parent nodes 601: This includes specifying (e.g., by user selection) all parent nodes 601 (entities) that will be included in the ownership structure. The selected parent nodes 601 are used to record the consolidation book journal entries for the relationship group. Those consolidation book journal entries created here are used during processing to create the next tier rollup. In general, one consolidation book is provided for each parent node 601 defined in the structure.

Child nodes 601 for each parent node 601: This includes specifying (e.g., by user selection) child (subsidiary) nodes 601 (entities), and assigning such child nodes 601 to their respective parent nodes 601. These specified relationships define a hierarchy for the organizational structure. In general, a child node 601 that has one parent node 601 in the structure typically represents a situation wherein an entity owns another entity either wholly or partially. A child node 601 that has multiple parent nodes 601 indicates, for example, an entity that is co-owned by multiple entities. As a result, the child node 601 will likely be included in multiple roll-ups/books within the structure.

Ownership Method: This includes specifying the method by which each parent node 601 owns a child node 601.

Subsidiary Ownership Percentage: As mentioned above, a child (subsidiary) node 601 that has multiple parent nodes 601 indicates, for example, an entity that is co-owned by multiple entities. If the ownership percent is less than 100% for a particular parent/child relationship, then multiple parent nodes 601 can be specified along with the ownership amount allocated for each parent node 601.

The defined structure is then saved 354 as a draft. In at least one embodiment, such draft can be optionally reviewed 355 using a map view that depicts a visual representation of the structure by period, and/or a hierarchical view. Referring now to FIG. 20, there is shown a screen shot depicting an example of a user interface 2000 for displaying a map view of an organizational structure, according to one embodiment.

Next, consolidation rules are specified 356 for each parent node 601 in the structure. In at least one embodiment, one consolidation book is specified for each parent node 601 defined in the structure. In order to facilitate the automatic creation of books, user 100 can define the consolidation configuration and rules.

In at least one embodiment, step 356 includes performing any or all of the following actions related to a structure period:

Structure Period Lister Actions
  Add new period.
    Header action to create a new ownership structure period.
      Case 1: If no period data exists, a new structure period is created.
      Case 2: If period data exists, the system uses the last ownership period data as a starting point for making edits to a new period.
  Export ownership structure details.
  Edit structure period details for the selected period.
  View Structure period details for the selected period.
  Launch a map view of the structure.
  Delete the structure period details for the selected period.
Structure Period Actions
  Save structure as draft.
    Case 1: If no consolidation rules are entered, no books are generated.
    Case 2: If consolidation rules are entered, the system validates on save that all required rules are entered.
      If yes, then create books.
      If no, fail save and generate error for user 100 to complete rules.
  Cancel.
  Activate: Performs validation, automatically creates/ updates the consolidation books (one book per unique parent node 601), and activates the ownership structure. The ownership structure then becomes available for consolidation processing.

Validation
In at least one embodiment, the validate operation is only available when the structure is in a Draft or Reviewed needed state.
The system automatically checks for circular references of parent/child nodes 601, checks that the total ownership percentage does not exceed 100%, creates/updates books, and sets book status to Active.

Structure Period Detail Actions
Line Action link to book on each parent entity record.
After activation is complete and books are created, a line action is provided that opens a book in edit mode to allow user 100 to make any additional book edits (per book) to complete the configuration. Such edits can include, for example:
select additional dimensions;
select additional journals;
define accounts to override (if multiple base currency is activated);
define additional elimination accounts.
Edit ownership structure (see more details below).
Consolidate: Invokes a user interface for initializing/running consolidation processing. In at least one embodiment, this is only enabled for active structures.

Figure 19B:
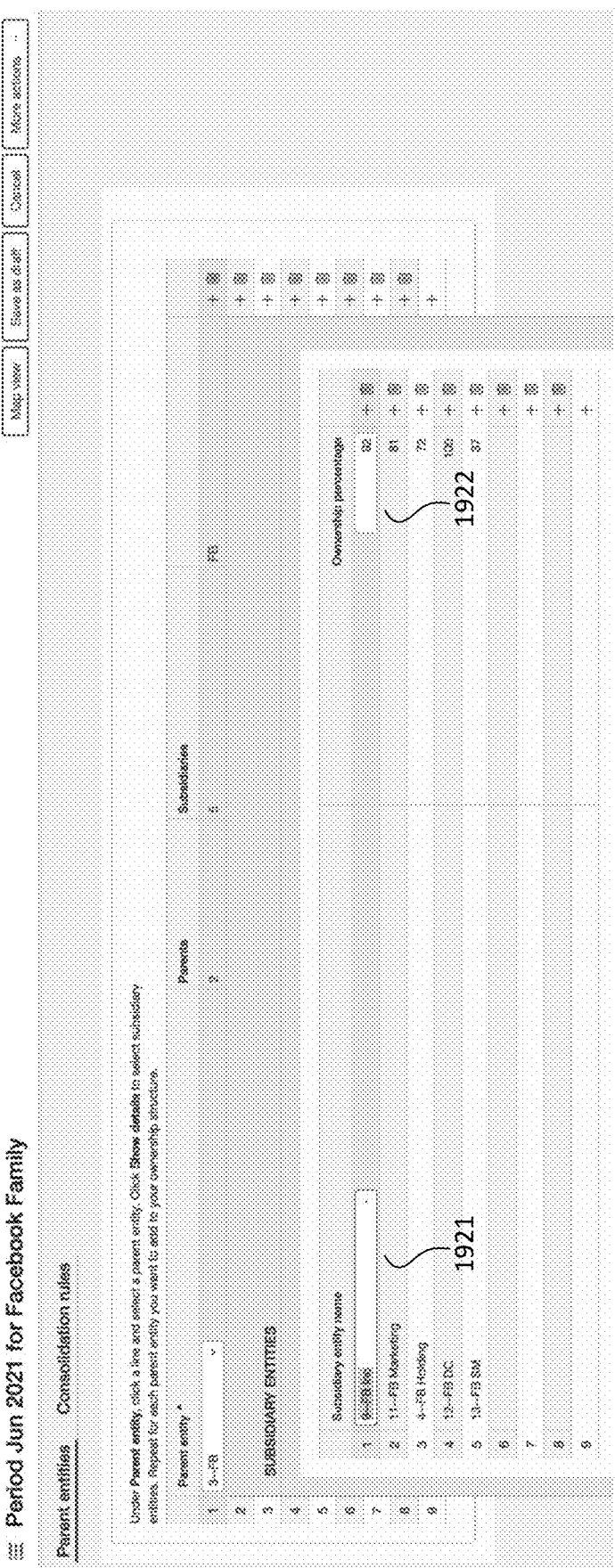

Referring now to FIG. 19B, there is shown a screen shot depicting an example of a user interface 1920 for specifying subsidiary entities, according to one embodiment. User 100 can specify a name for each subsidiary entity in field 1921, and an ownership percentage in field 1922.

Figure 19C:
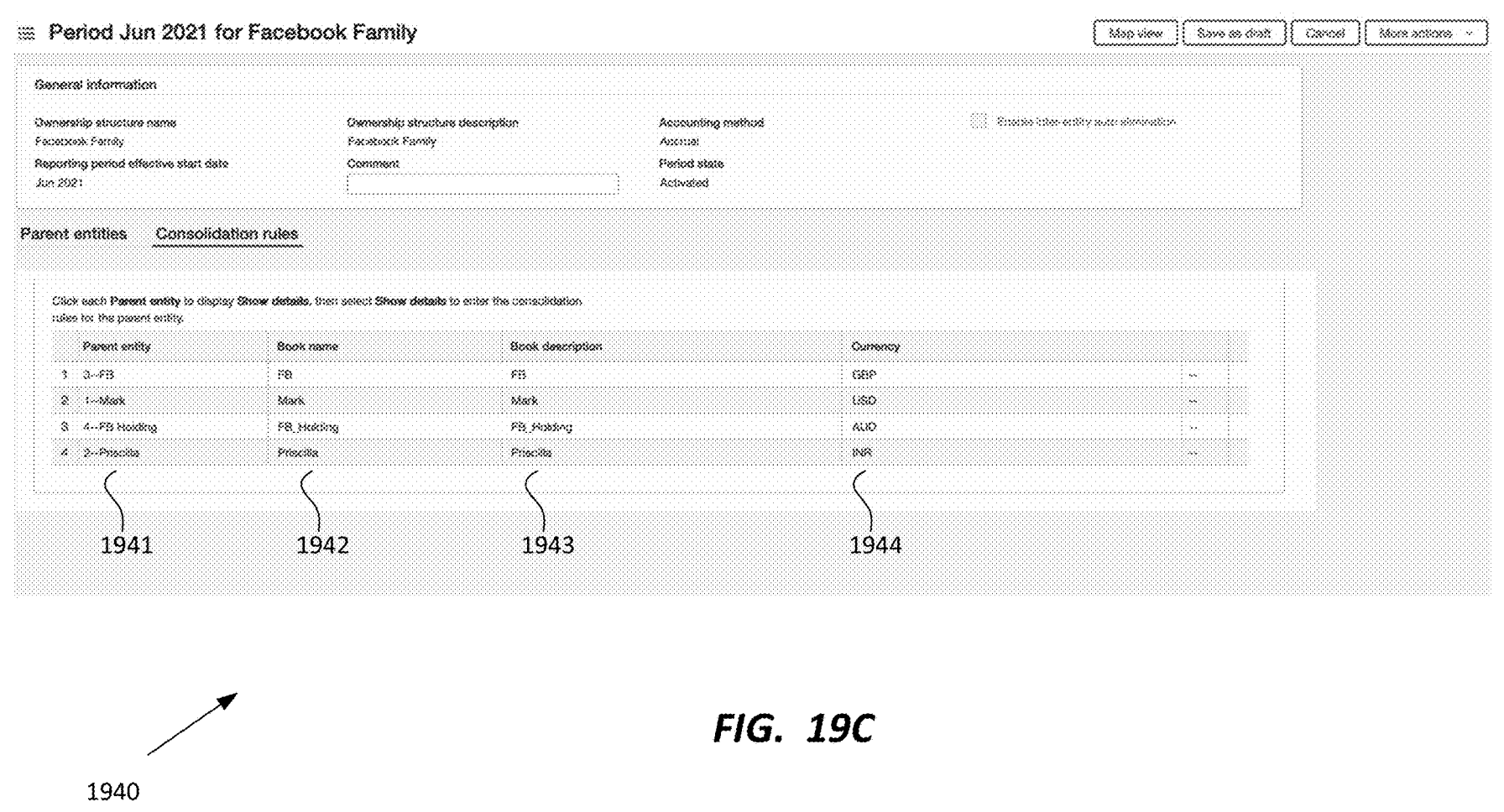

Referring now to FIG. 19C, there is shown a screen shot depicting an example of a user interface 1940 for specifying consolidation rules, according to one embodiment. User 100 can specify a parent entity 1941, book name 1942, book description 1943, and/or currency 1944.

Figure 19D:

Referring now to FIG. 19D, there is shown a screen shot depicting an example of a user interface 1961 for specifying additional details regarding consolidation rules for an entity, according to one embodiment. User 100 can click on a parent entity 1941 in FIG. 19C; in response, pane 1961 is displayed, including additional details regarding parent entity 1941.

The structure is then activated 357, so that consolidations can now be processed on nodes 601 within the structure. In at least one embodiment, step 357 includes automatically checking that all required fields are completed for books creation, and that the specified ownership percentage for each node 601 does not exceed 100%.

In at least one embodiment, an optional step of modifying 358 books is performed, in which any additional book edits (per book) may be made to select additional dimensions, select additional user-defined journals, define accounts to override, and/or define additional elimination accounts.

The method then ends 398.

Editing an Ownership Structure
As mentioned above, in at least one embodiment, the system can provide functionality to allow user 100 to edit an ownership structure, either for an existing structure period or for a new structure effective period, as follows:

Editing an Ownership Structure (Existing Structure Period)
In at least one embodiment, the ownership structure is versioned, and changes made to the structure are tracked. Any changes made to the structure automatically place the state in draft. Editing takes place as follows:
User 100 selects a structure and period, and clicks Edit.
In response, the system generates a warning: "Editing an active structure will change state to Draft and consolidations cannot be processed until the structure is activated. Are you sure you want to continue?"
User 100 then make edits to the ownership structure, as described in more detail below.
In at least one embodiment, if tier consolidation has already been run for the period being edited, then the system automatically sets the period to the impacted periods. A reconsolidation is performed after the edits are completed and the book is again activated.
In at least one embodiment, future periods are automatically deleted and/or updated.
If any new parent nodes 601 were added, user 100 reviews and/or defines consolidation rules for any new books.
User 100 can optionally save the ownership structure as a draft.
User 100 activates the ownership structure. In response, the system check that all required fields are completed for books creation, checks that the total ownership percentage does not exceed 100%, and triggers automatic creation or update of consolidation books.

Editing an Ownership Structure (Creation of New Structure Effective Period)
In at least one embodiment, when a structure change is to be recorded for a new period, user 100 provides a new effective period. The system uses the last period data as the starting point for the new period data, and then allows user 100 to make additional edits to the ownership structure as desired. Editing takes place as follows:
User 100 selects a structure and period, and clicks Edit.
User 100 selects "Add new period".
In response, the ownership structure is automatically copied (duplicated) from the last ownership structure period and placed in draft mode.
User 100 specifies the reporting period effective start date.
In at least one embodiment, this is done by selecting from a list, which may be filtered to only include periods after the latest version of the ownership structure.
User 100 makes desired edits to the ownership structure.
In at least one embodiment, if tier consolidation has already taken place for the period being edited, then any future impacted periods are automatically marked as "review needed," indicating that reconsolidations must take place after edits and activation are completed.
In at least one embodiment, if any new parent nodes 601 were added, the system presents a screen to allow user 100 to review and/or define consolidation rules for any new book(s) associated with the new parent node(s) 601.
If any new parent nodes 601 were added, user 100 reviews and/or defines consolidation rules for any new books.
User 100 can optionally save the ownership structure as a draft.
User 100 activates the ownership structure. In response, the system check that all required fields are completed for books creation, checks that the total ownership percentage does not exceed 100%, and triggers automatic creation or update of consolidation books.

In at least one embodiment, when a structure is edited or deleted, if there is any book which has no reference to any previous or future structures, the book can be automatically deleted, along with its consolidated data. In at least one embodiment, user 100 is first prompted to approve the automatic deletion of such data.

In at least one embodiment, if user 100 removes an entity from a parent node 601, and there is no other child node 601 associated with that parent node 601, parent node 601 becomes a standalone node 601. In at least one embodiment, the following validations apply to standalone parent nodes 601:

- In at least one embodiment, when a structure is created, the system validates that all parent nodes 601 have at least one child node 601. If not, user 100 can save parent node 601 with no child node 601 in the draft state, but cannot activate parent node 601.
- In at least one embodiment, when a structure is edited, if consolidation has not been done for a particular book associated with a parent node 601 that has no child nodes 601, the system does not allow the structure to be saved, but instead issues an error or warning message.

In at least one embodiment, when a structure is edited, if consolidation is specified for a book associated with a parent node 601 that has no child nodes 601, the system issues an error message.

Use Cases

The following are examples of use cases that are supported in at least one embodiment, for editing ownership structures.

UC1: Add new child node 601 to the structure under an existing parent node 601.
Steps:
Select existing parent node 601 and add child node 601.
In at least one embodiment, the system performs validation to child node 601 is not already selected under a different parent node 601, and to ensure that the sum of ownership percentage does not exceed 100%.
During activation, the system performs an automatic update to the book.

UC2: Remove consolidation node 601 from the structure.
Steps:
Select existing parent node 601.
Remove child node 601.
Child node 601 is now inactive in the structure.
During activation, the system performs an automatic update to the book. For the specified period and all future periods, this node 601 will not be consolidated with the consolidation ownership structure group.

UC3: Move a child node 601 from one parent node 601 in the structure to another.
Steps:
Select existing parent node 601.
Remove child node 601.
Select another existing parent node 601.
Add selected child node 601 to selected parent node 601.

During activation, the system performs an automatic update to the affected books, as follows:
If the selected parent node 601 is already a parent of another node 601, then it is automatically added to the existing parent book automatically during activation.
If the selected parent node 601 is new in the structure, then creation of a new book is automatically triggered. The system validates that all required fields on consolidation rules are completed, and automatically creates the new book during activation.

UC4: Add new parent node 601 to the structure.
Steps:
Select new parent node 601.
Add child node(s) 601, and/or move existing child node(s) 601 to new parent node 601.
During activation, the system automatically creates book(s) for the new parent node 601. The system automatically validates that all required fields on consolidation rules are completed, and automatically creates the new book.

UC5: Add new parent node 601 to the structure by making an existing child node 601 in the structure a parent node 601.
Steps:
Select existing child node 601 (in the structure) to change it into a new parent node 601.
Add child node(s) 601, and/or move existing child node(s) 601 to new parent node 601.
During activation, perform automatic creation of book(s).
During activation, the system automatically creates book(s) for the new parent node 601. The system automatically validates that all required fields on consolidation rules are completed, and automatically creates the new book.

UC6: Remove all child nodes 601 from a parent node 601, but leave parent node 601.
Steps:
Select existing parent node 601.
Remove all child node(s) 601 from.
Parent node 601 is now a flat consolidation containing one node 601.
During activation, the system automatically updates book(s) to reflect the new structure. Since parent node 601 is still being consolidated, its book is still needed. All associated child node(s) 601 will be removed from consolidation automatically during ownership activation.

UC7: Remove a parent node 601 and all of its child nodes 601.
Steps:
Select existing parent node 601.
Remove parent node 601 and all of its child node(s) 601.
During activation, the system automatically updates book(s) to reflect the new structure. For the specified period and all future periods, parent node 601 and its child node(s) 601 will no longer be used in the ownership structure.

UC8: Change structure name (first lister): The first user 100 to list the structure can click on an edit button to change the structure name.

UC9: Change structure description (first lister): The first user 100 to list the structure can click on an edit button to change the structure description.

UC10: Change starting period to consolidate: User 100 can change or update the starting period for a consolidation.

Steps:
Select ownership structure.
Enter period.
If the period is prior to the earliest period in the structure, the system issues a prompt asking user 100 to confirm that he or she wished to proceed.
The system checks whether a consolidation has already run against the specified future period. If not, the new structure data is generated. If yes, the system marks the consolidated data as inactive.

UC 11: Change ownership percentage: User 100 can change or update the ownership percentage for a relationship between a parent node 601 and a child node 601.

During activation, the system automatically updates the ownership structure for use during the consolidation process.

UC 12: Inactivate structure (first lister): The first user 100 to list the structure can inactivate the structure and all related consolidation books.

UC 13: Delete structure (first lister): The first user 100 to list the structure can delete the structure and all related consolidation books.

UC 14: Delete structure period data (first lister): The first user 100 to list the structure can delete period data for the structure.

Versioning

In at least one embodiment, updating an ownership structure automatically updates the version of the structure, and causes the new version to be applied to the period specified on edit. This also automatically updates future periods if they do not already have a version assigned to that period. In at least one embodiment, when a modification is made, the structure is placed back in draft mode until it is activated. This prevents partial changes to be processed during consolidation.

In at least one embodiment, an ownership percentage change made on a prior period when the consolidation has run will impact existing subsequent consolidations and will require deletion of consolidation data and reconsolidation.

In at least one embodiment, the system provides the ability to view version history.

EXAMPLES

Figure 10:
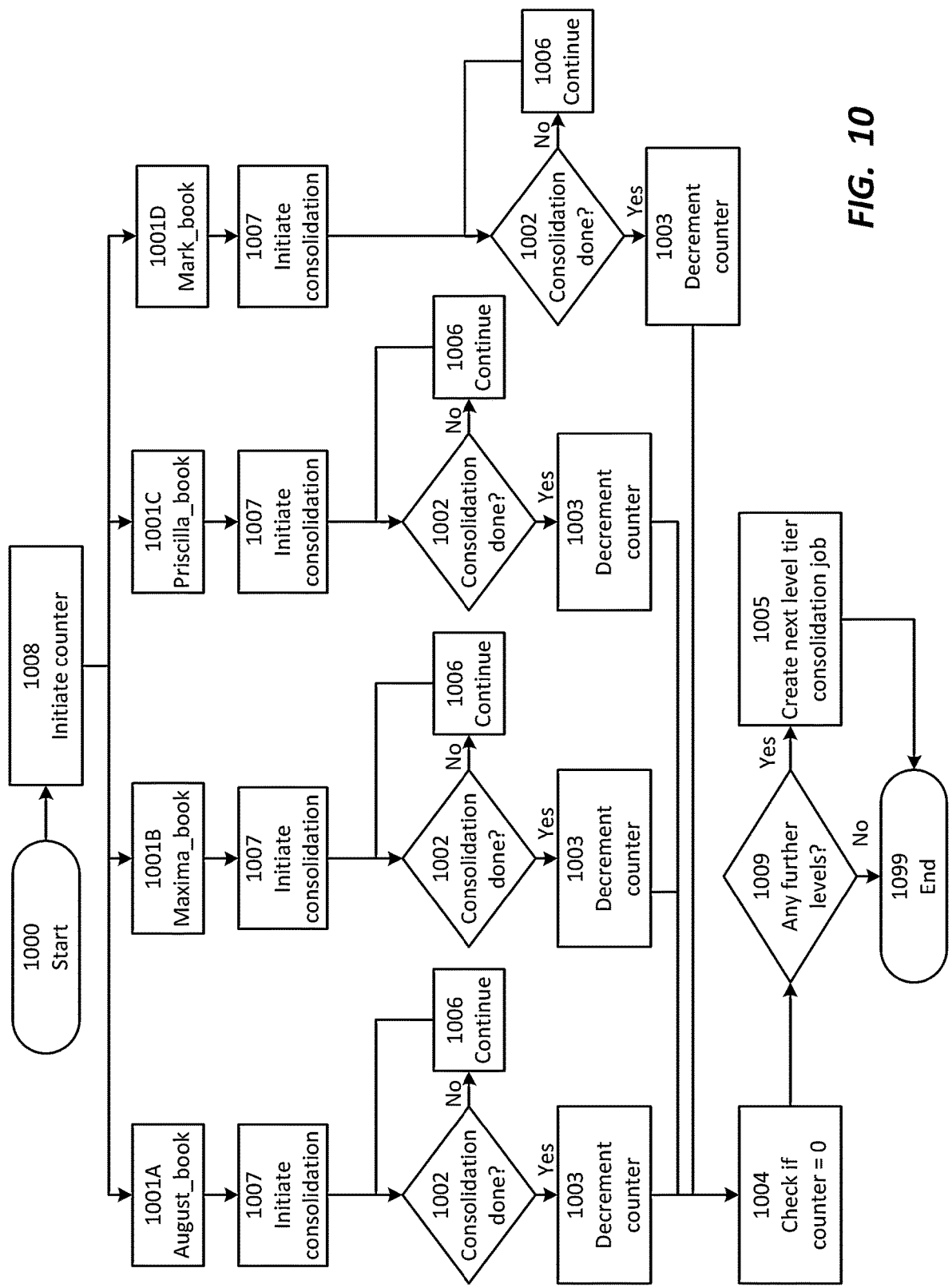
FIG. 10 is a flow diagram depicting a method for performing tier consolidation in parallel according to one embodiment.

Referring now to FIG. 10, there is shown a flow diagram depicting an example of a method for performing tier consolidation in parallel according to one embodiment. FIG. 10 is described with reference to the example organizational structure depicted in FIG. 6.

The method begins 1000. A counter is initiated 1008, indicating how many nodes 601 are in the current level to be consolidated. The example of FIG. 10 includes four books 1001A, 1001B, 1001C, and 1001D, corresponding to nodes 601A and 601B, as well as two additional nodes, respectively. Accordingly, in step 1008, the counter is initiated to the value of 4.

As depicted in FIG. 6, nodes 601A and 601B are at the same level, and therefore can be consolidated in parallel with one another. Accordingly, FIG. 10 depicts an initiate consolidation step 1007 for each of nodes 601A and 601B, as well as two additional nodes, performed substantially concurrently. In step 1002, the system checks if each consolidation is finished; if so, the counter is decremented 1003. In at least one embodiment, this is done using a pragma autonomous transaction to ensure that no two jobs are updating the counter at the same time. In at least one embodiment, a PL/SQL block of code decrements the counter, which is enclosed within a pragma autonomous function. Otherwise, the consolidation continues 1006.

Once the counter reaches zero, as determined in step 1004, all nodes 601 in the current level have been consolidated. The system then determines 1009 if any further levels need to be consolidated, or if the level of the selected node 601 has been reached. If any further levels need to be consolidated, the system proceed with step 1005, where the next level tier consolidation job is created (if any). If there are no further levels to be consolidated, the method ends 1099.

Figure 11:
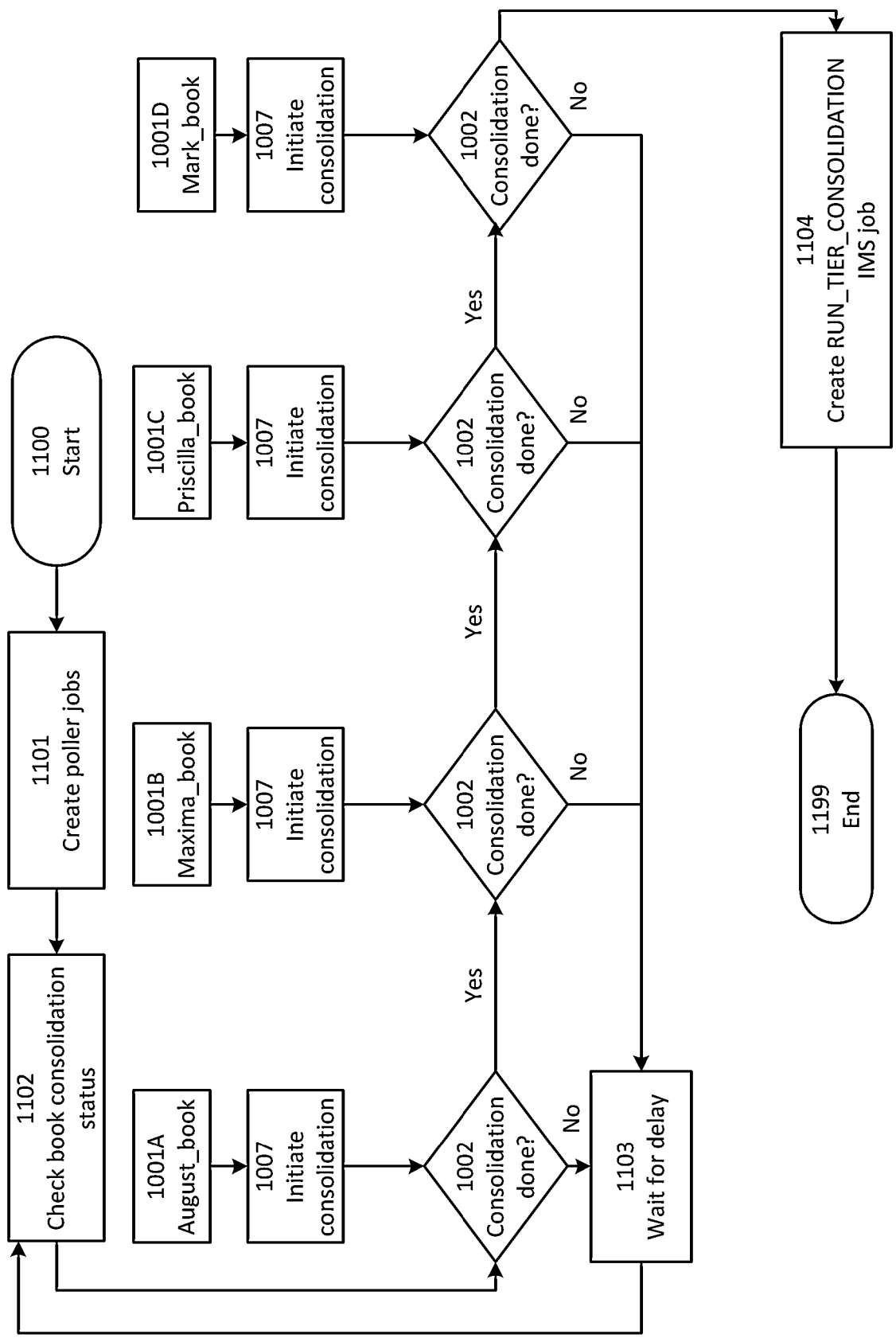
FIG. 11 is a flow diagram depicting an alternative method for performing tier consolidation in parallel using an "IMS poller job" process, according to one embodiment.

Referring now to FIG. 11, there is shown a flow diagram depicting an example of an alternative method for performing tier consolidation in parallel using an "Intacct Messaging System (IMS) poller job" process, according to one embodiment. Poller jobs are jobs that can be created after some intervals or delays.

The example of FIG. 11 includes four books 1001A, 1001B, 1001C, and 1001D, corresponding to nodes 601A and 601B, as well as two additional nodes. As depicted in FIG. 6, nodes 601A and 601B are at the same level, and therefore can be consolidated in parallel with one another. Accordingly, FIG. 11 depicts an initiate consolidation step 1007 for each of nodes 601A and 601B, as well as two additional nodes, performed substantially concurrently.

The method begins 1100. One or more poller jobs are created 1101. In at least one embodiment, these poller jobs periodically check 1102 whether the various consolidation steps 1007 have been completed. If, in any of steps 1002, the poller jobs determine that the consolidation step 1007 has not yet been completed for one of nodes 601, the poller jobs wait 1103 for a delay time period, and check again 1102.

Once it is determined that the consolidation step 1007 has been completed for all nodes 601 being processed, the system proceeds to step 1104, where a RUN_TIER_CONSOLIDATION IMS job is created, which triggers the tier consolidation job. The method then ends 1199.

One advantage of the method depicted in FIG. 11 is that, while creating these jobs, there is a means to specify that the job be created after a particular interval or delay (specified in seconds). The jobs can also be retried after one or more iterations. However, in some cases, the interval or delay cannot be hardcoded for consolidation jobs because the processing time can vary based on the amount of data. In addition, in some situations, this process can slow down consolidation performance. Finally, since the jobs are often light-weighted, it may not be practicable to run them for long periods of time.

Figure 12:
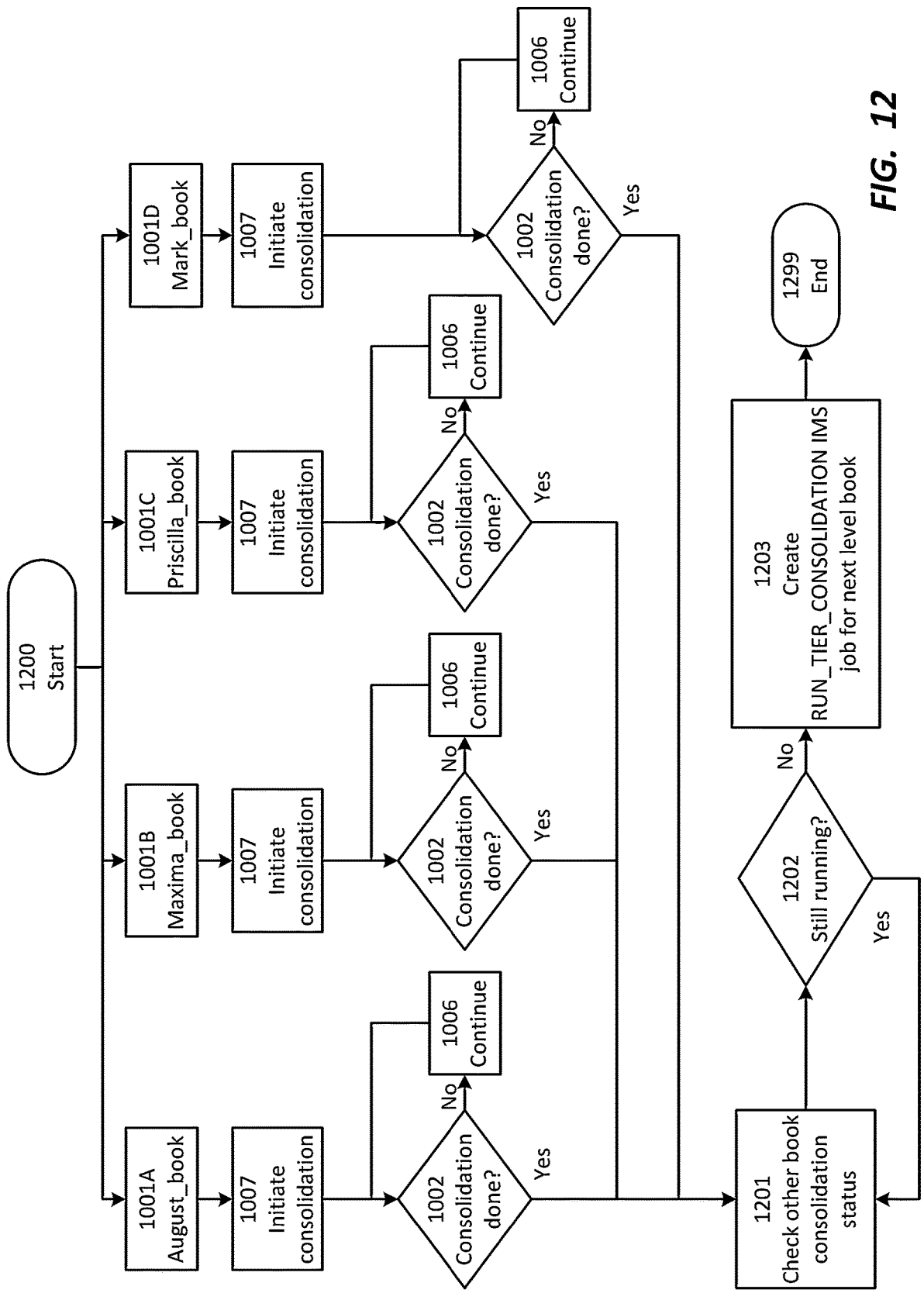
FIG. 12 is a flow diagram depicting an alternative method for performing tier consolidation in parallel using a "next roll up by last consolidation job" process, according to one embodiment.

Referring now to FIG. 12, there is shown a flow diagram depicting an example of an alternative method for performing tier consolidation in parallel using a "next roll up by last consolidation job" process, according to one embodiment. In this approach, the system takes care to ensure that two jobs that complete at the same time will not create conflicting next roll-up jobs for consolidation. This can create challenges in some situations, since there is a possibility that two jobs completing at the same exact time will not properly create the next roll up job for consolidation.

The method begins 1200. The example of FIG. 12 includes four books 1001A, 1001B, 1001C, and 1001D, corresponding to nodes 601A and 601B, along with two additional nodes. As depicted in FIG. 6, nodes 601A and 601B are at the same level, and therefore can be consolidated in parallel with one another. Accordingly, FIG. 12 depicts an initiate consolidation step 1007 for each of nodes 601A and 601B, as well as two additional nodes, performed substantially concurrently.

In step 1002, the system checks if each consolidation is finished. Once all consolidations are finished, the system proceeds to step 1201; otherwise, the consolidations continue 1006.

In step 1201, the system checks the status of consolidation(s) for other book(s). If, in step 1202, they are still running, the system waits and returns to step 1201 to check again. If no other consolidations for other books are running, the system proceeds to step 1203, where a RUN_TIER_CONSOLIDATION IMS job is created for the next level book. The method then ends 1299.

Figure 13:
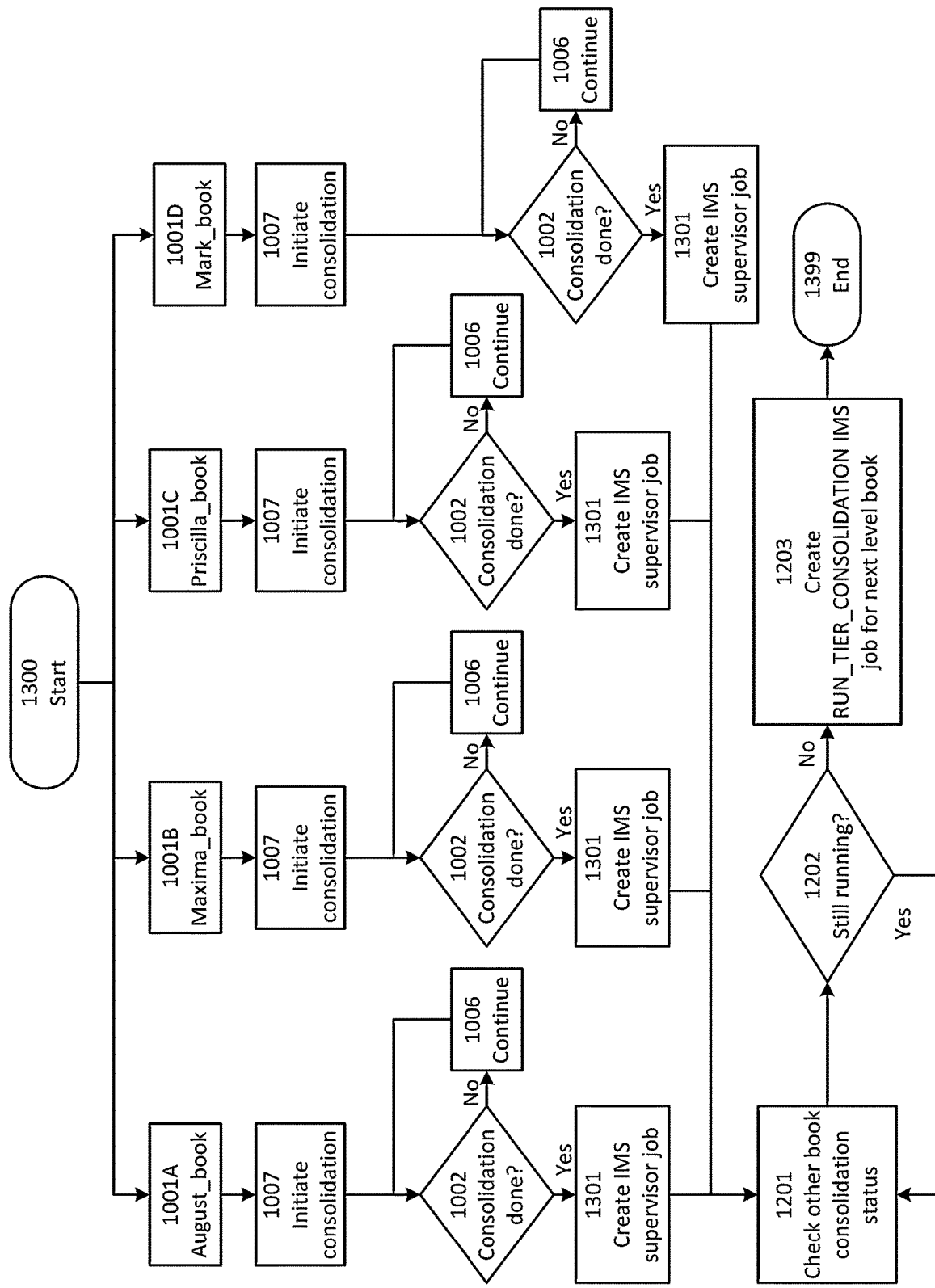
FIG. 13 is a flow diagram depicting an alternative method for performing tier consolidation in parallel using a "parallel consolidation by supervisor job" process, according to one embodiment.

Referring now to FIG. 13, there is shown a flow diagram depicting an example of an alternative method for performing tier consolidation in parallel using a "parallel consolidation by supervisor job" process, according to one embodiment.

The method begins 1300. The example of FIG. 13 includes four books 1001A, 1001B, 1001C, and 1001D, corresponding to nodes 601A and 601B, along with two additional nodes. As depicted in FIG. 6, nodes 601A and 601B are at the same level, and therefore can be consolidated in parallel with one another. Accordingly, FIG. 13 depicts an initiate consolidation step 1007 for each of nodes 601A and 601B, along with two additional nodes, performed substantially concurrently.

In step 1002, the system checks if each consolidation is finished. Once each consolidation is finished, an IMS supervisor job is created 1301. The IMS supervisor job is based on a supervisor job model, wherein, once each node consolidation is complete, it creates a supervisor job that checks the status of other parallel jobs. Such an approach can lead to an excessive number of jobs, as the number of jobs will be twice the number of consolidation jobs (one for the supervisor and one for the consolidation itself).

Once all consolidations are finished, the system proceeds to step 1201; otherwise, the consolidations continue 1006.

In step 1201, the system checks the status of consolidation(s) for other book(s). If they are still running, the system waits and returns to step 1201 to check again. If no other consolidations for other books are running, the system proceeds to step 1203, where a RUN_TIER_CONSOLIDATION IMS job is created for the next level book. The method then ends 1399.

Figure 15:
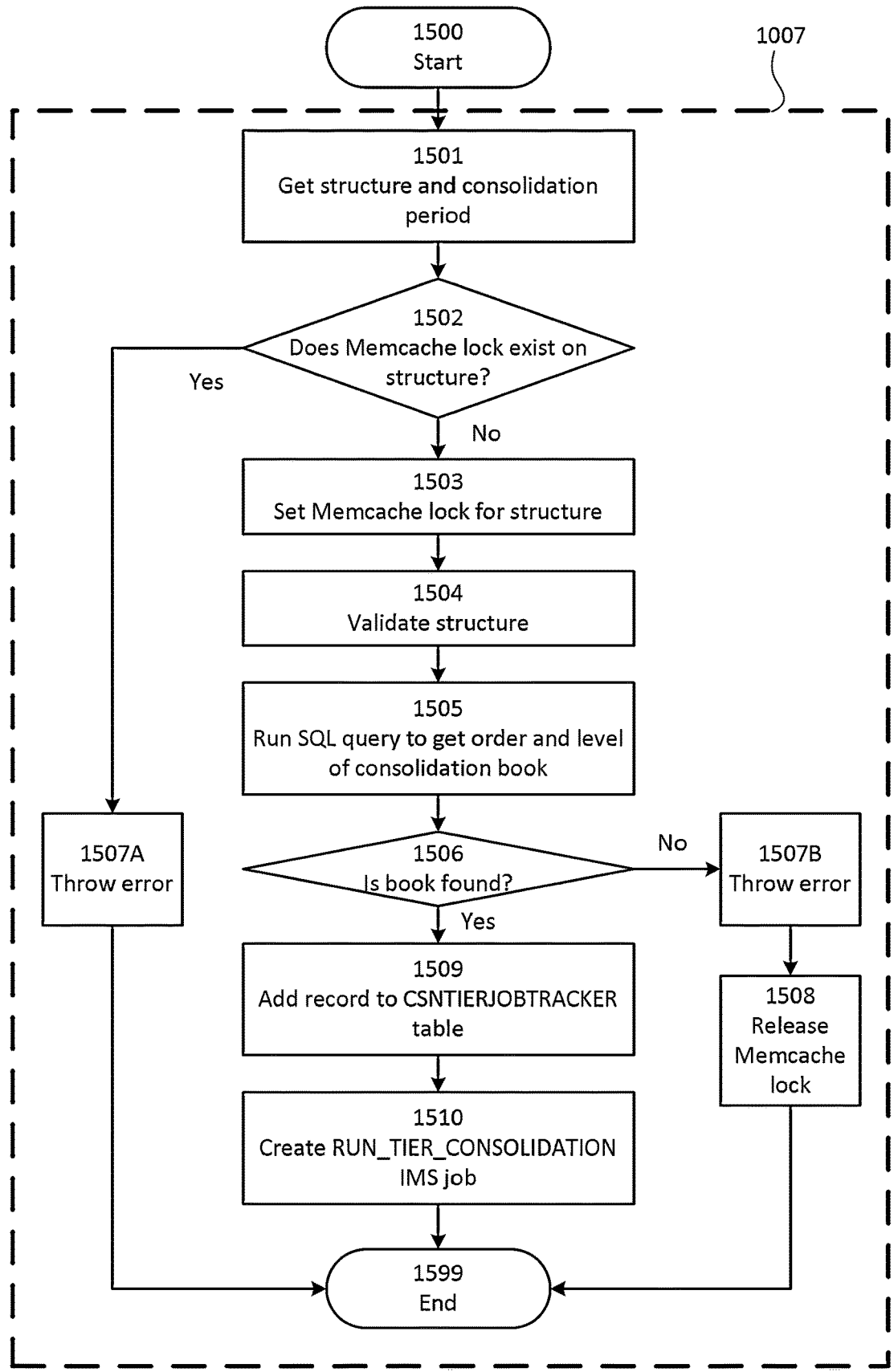
FIG. 15 is a flow diagram depicting a method for initiating consolidation by IMS job creation, according to one embodiment.

Referring now to FIG. 15, there is shown a flow diagram depicting more details for a method for initiate consolidation step 1007, including IMS job creation, according to one embodiment.

The method begins 1500. The system obtains 1501 the organizational structure and the period for which consolidation is to be run. In at least one embodiment, such information is provided via user input and/or by retrieving the information from data store 106.

Next, the system checks 1502 whether a Memcache lock exists on the organizational structure. If the structure is locked, an error message is issued 1507A, and the method ends 1599.

If no Memcache lock exists, the system proceeds. First, a Memcache lock is set 1503, and the structure is validated 1504. Next, an SQL query is run 1505, as described above, to obtain the order and level of the consolidation book. Next, the system checks 1506 whether the specified book is found. If not, an error message is issued 1507B, the Memcache lock is released 1508, and the method ends 1599.

If, in step 1506, the book is found, the system adds 1509 a record to a table to track the new job; in at least one embodiment, this table is referred to as the CSNTIERJOBTRACKER table. Next, the system creates 1510 the consolidation job, which in at least one embodiment is referred to as a RUN_TIER_CONSOLIDATION IMS job. The method then ends 1599.

Figure 16:
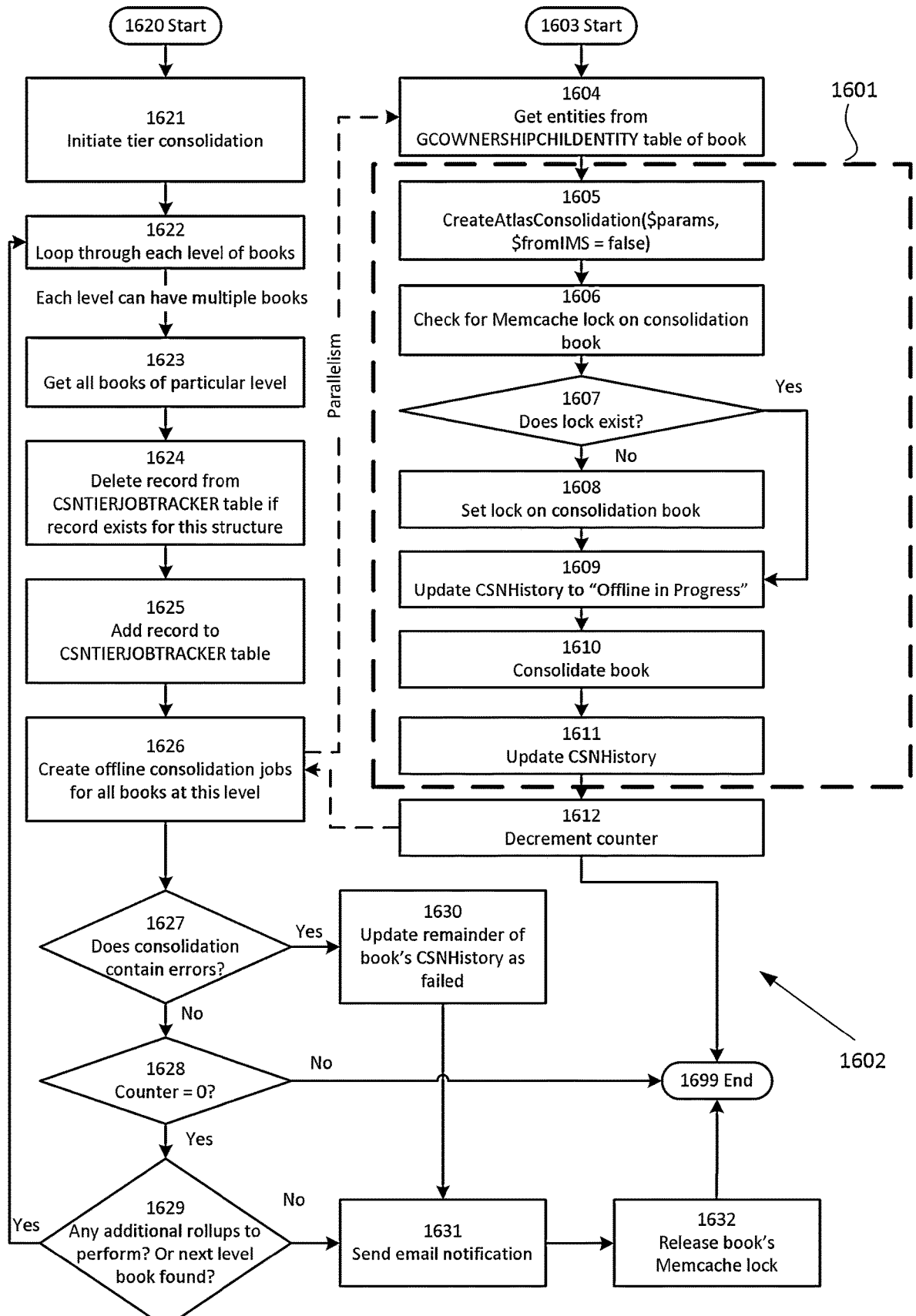
FIG. 16 is a flow diagram depicting a method for integrating a current consolidation model into a new tier consolidation data flow, according to one embodiment.

Referring now to FIG. 16, there is shown a flow diagram depicting a method for integrating consolidation method 1601 into overall tier consolidation data flow 1602, according to one embodiment.

The method begins 1620. The system initiates 1621 tier consolidation. It loops 1622 through each level of books, wherein each level may have one or more books. For each level, steps 1623 through 1629 are performed.

The system gets 1623 all books of the level being processed. If a record exists for a book, it deletes 1624 the record from the CSNTIERJOBTRACKER table. Then, the system adds 1625 a record to the CSNTIERJOBTRACKER table, and creates 1626 offline consolidations jobs for all books at this level; in at least one embodiment, these jobs can run in parallel.

Steps 1603 through 1611 are performed when consolidating a book. The method begins 1603. The system gets 1604 entities from a table, such as the GCOWNERSHIPCHILDENTITY table of the book. Consolidation process 1601 then begins, including steps 1605 through 1611.

In step 1605, the system performs CreateAtlasConsolidation($params, $fromIMS=false) process to create an atlas, or roadmap, of the consolidation process. The system then checks 1606 whether there is a Memcache lock on the book being consolidated. If, in step 1607, no lock exists, the system sets 1608 the lock.

Next, the system updates 1609 a table entitled CSNHistory to "Offline in Progress" to indicate that the book is being consolidated. In at least one embodiment, CSNHistory tracks consolidation status of each run; status is updated to "in progress" when a consolidation is initiated. The book is then consolidated 1610, and the CSNHistory is updated 1611 to indicate whether the consolidation succeeded or failed. The counter indicating how many books have been consolidated is decremented 1612 using pragma autonomous_transaction.

Once the consolidation job is finished, the system checks 1627 whether the consolidation contains errors. If so, it updates 1630 the remainder of the book's CSNHistory to indicate that the consolidation failed, and proceeds to step 1631.

If, in step 1627, no errors were found, the system checks 1628 if the counter has reached zero, indicating that other books at this level have completed consolidation. If not, the method ends 1699.

If, in step 1628, the counter has reached zero, the system checks 1629 whether there are additional rollups (consolidations) to be performed, or if a next level book has been found. If not, it sends 1631 an email notification as to current status, and releases 1618 the book's Memcache lock. The method ends 1699.

If, in step 1629, a determination is made that additional rollups (consolidations) exist, or a next level book has been found, the system returns to step 1622.

State Flow Diagram

Figure 8:
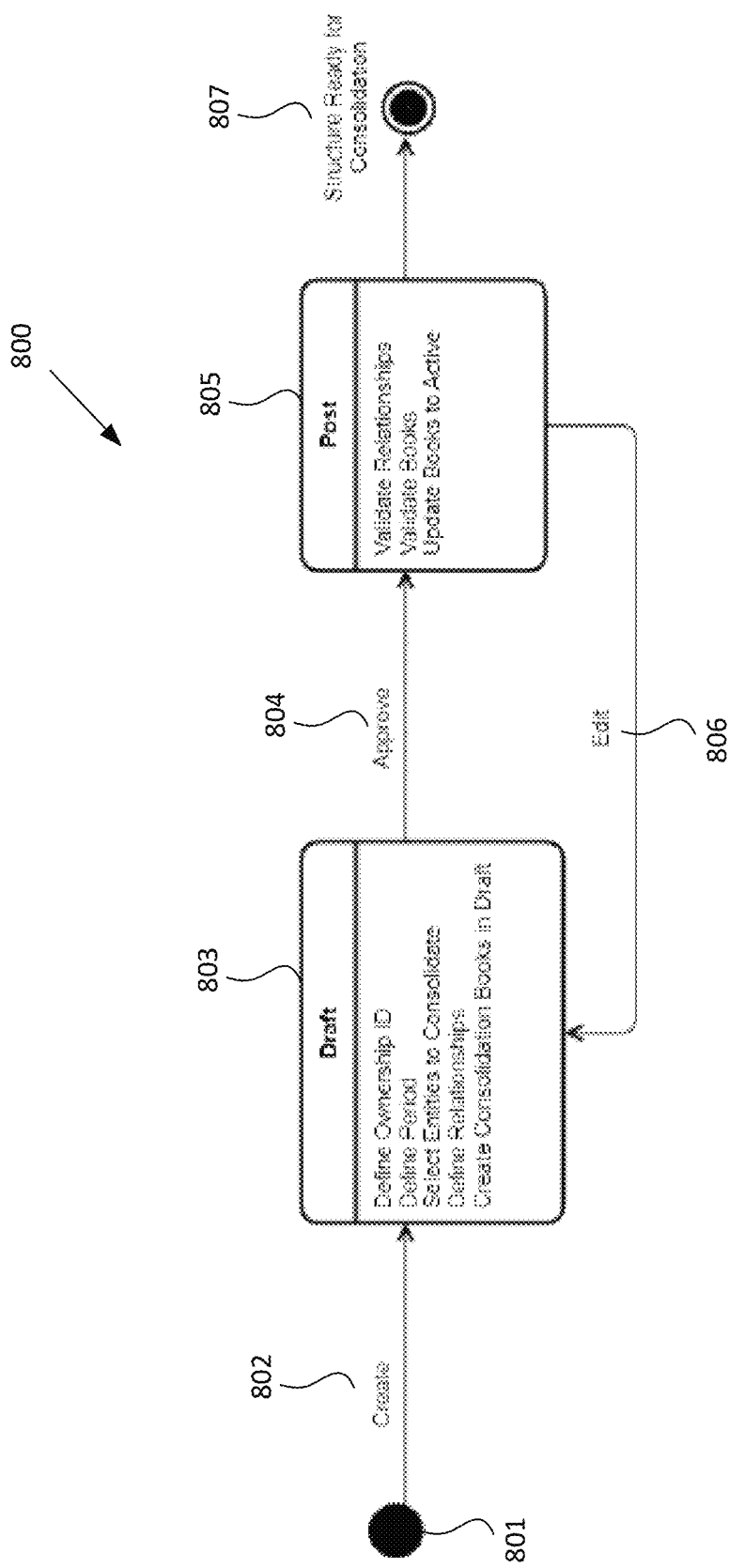
FIG. 8 is a block diagram depicting a state flow diagram 800 for creating an organizational structure that is ready for consolidation, according to one embodiment.

Referring now to FIG. 8, there is shown a block diagram depicting a state flow diagram 800 for creating an organizational structure that is ready for consolidation, according to one embodiment. The system begins in initial state 801. In response to a Create operation 802, an organizational structure is created and the system moves to Draft state 803. Here, various parameters and details are provided, defined, and/or selected for the organizational structure, including:
- ownership ID;
- period to be analyzed;
- nodes 601 to be consolidated; and
- relationships among nodes 601.

In at least one embodiment, in Draft state 803, an initial draft of consolidation books can also be created.

In response to an Approve operation 804, the organizational structure is posted, and the system moves to state 805. Here, the various relationships among nodes 601 are validated, and consolidation books are validated and/or updated as appropriate. If necessary, an Edit operation 806 returns the system to Draft state 803. Otherwise the system moves to state 807, wherein the organizational structure is ready for consolidation using the techniques described herein.

Prevention of Circular References

In at least one embodiment, the SQL query for identifying an optimal tier consolidation path is able to automatically identify and prevent circular references. If circular references are detected in the organizational structure, the system issues an error message so that such references can be corrected before consolidation is attempted. In at least one embodiment, circular references are detected using an Oracle Hierarchical query that maps parent and child nodes, and traverses throughout the structure, issuing an error message if any loop is found.

Figure 9:
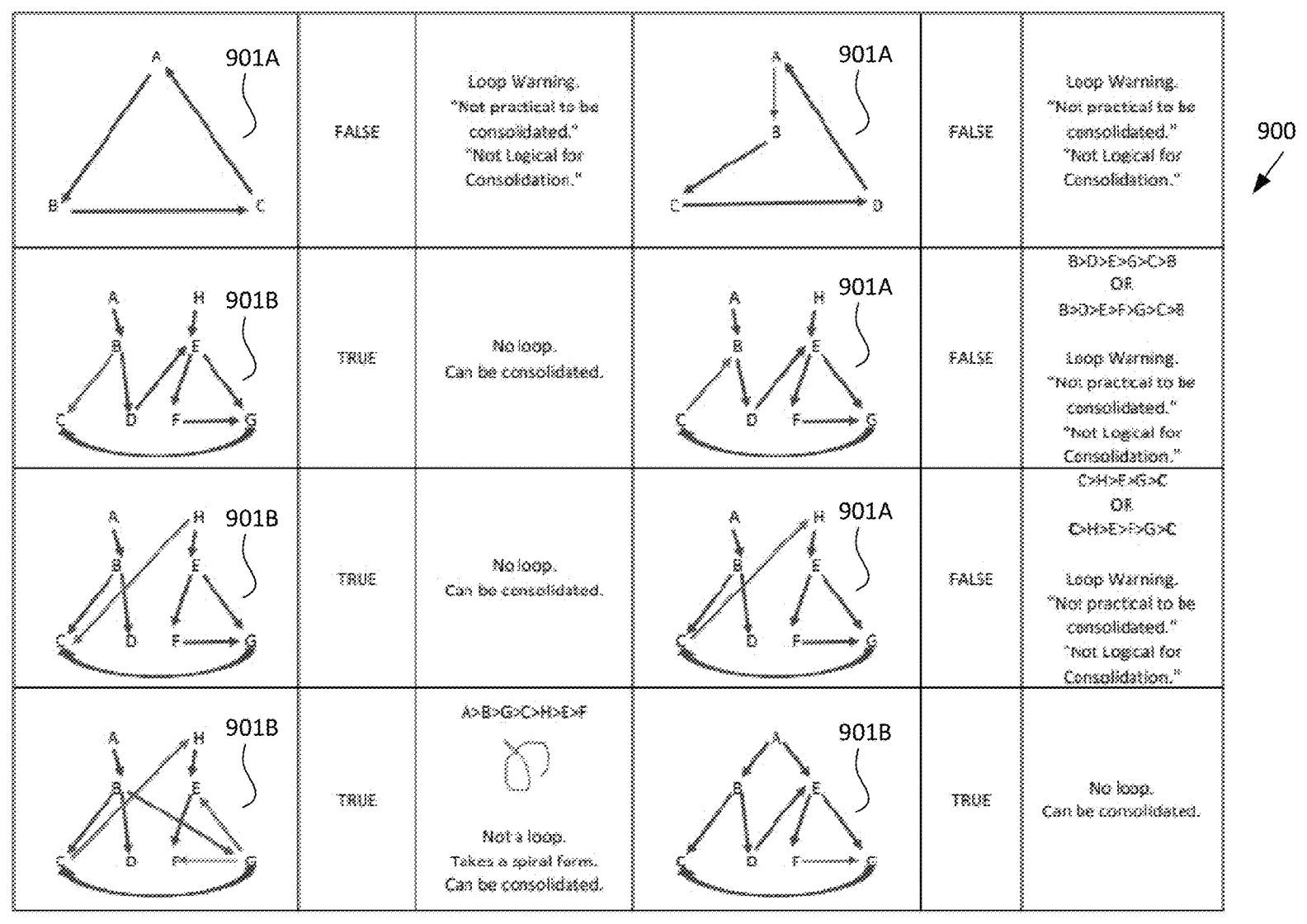

Referring now to FIG. 9, there is shown a table 900 depicting examples of various types of circular references that can be detected by the described system. In table 900, some structures 901A are designated "FALSE", indicating that the structure is not practical or logical for consolidation due to circular references. Other structures 901B are designated "TRUE", indicating that there are no circular references and the structure can be consolidated using the techniques described herein.

Referring now to FIG. 17, there is shown an example of an Application Programming Interface (API) 1700 for triggering tier consolidation according to one embodiment.

Ownership Structure

As discussed above, in at least one embodiment, the organizational structure can be an ownership structure that allows user 100 to define all nodes 601 (entities) included in the structure and to specify relationships between parent nodes 601 and child nodes 601. In addition, an ownership percentage can be specified for each such relationship, and such ownership percentage is then used during consolidation generation.

In at least one embodiment, the ownership structure can be stored as data records within a database stored in data store 106. One example of a data format for the ownership structure includes the following elements:
- Ownership Structure (header);
  - Ownership Structure Name
  - Ownership Structure Description
  - Status (active or inactive)
    - Inactivate: Inactivates Consolidation Structure and all related consolidation books.
  - Automatic Elimination (yes or no)
    - Identifies whether automatic eliminations are to be used on this consolidation structure. This value is applied to all books in the structure.
  - Accounting Method (accrual or cash)
  - Structure Header Lister Actions (add or delete)
  - Structure Actions (save, continue, or cancel)
- Ownership Structure Period Details
  - Ownership Structure Name
  - Ownership Structure Description
  - Reporting period effective date
    - The effective period to use for consolidation until a change in a future period occurs.
  - Period State (draft, active, or review needed)
    - Draft: When an ownership structure is created, it is given an initial status of Draft. This allows user 100 to define and approve the structure including all entities and relationships as well as specifying the consolidation configuration and rules. A draft structure can be edited and does not impact versioning. In draft, the ownership structure can be reviewed for accuracy prior to processing any consolidations. In at least one embodiment, an ownership structure cannot be used in consolidation processing if in draft state.
    - Active: When the draft is activated, books are automatically created with the data specified.
    - Review needed: If user 100 inserts a record in the period details and the record has a period start date before the current (most recent) structure, then the system automatically sets the State to "Review Needed". In Review Needed, the ownership structure can be reviewed for accuracy prior to processing any consolidations. In at least one embodiment, an ownership structure cannot be used in consolidation processing in a Review Needed State. Additionally, if any of the subsequent periods have been consolidated, then they are marked to be re-consolidated.
  - Comment The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for automatic tier consolidation for an organizational structure comprising a plurality of levels and a plurality of nodes, each node being associated with one of the levels, the method comprising:
   at a hardware processing device, automatically identifying an optimal path for consolidation of at least a portion of the organizational structure, the path comprising a plurality of the nodes of the organizational structure, wherein the plurality of nodes comprises at least one parent node and at least one child node, and wherein each parent node is a parent to at least one child node;
   at the hardware processing device, automatically identifying at least one level associated with a plurality of parent nodes;
   at the hardware processing device, traversing the identified path by, for each node within the path:
   automatically identifying a level associated with the node;
   determining whether the node is a parent node; and
   responsive to the node being a parent node that is associated with the same level as at least one other parent node:
   performing consolidation on the parent node by aggregating data for each node that is a child of the parent node, wherein consolidation on the parent node is performed by the hardware processing device concurrently with and in parallel with performing consolidation on the at least one other parent node associated with the same level; and
assigning the aggregated data to the parent node; and
outputting at least one report comprising the aggregated data for at least one node.

2. The method of claim 1, further comprising, prior to automatically identifying an optimal path for consolidation of at least a portion of the organizational structure, identifying a portion of the organizational structure to be consolidated.

3. The method of claim 2, wherein:
identifying a portion of the organizational structure to be consolidated comprises receiving input selecting a parent node within the organization structure; and
the portion of the organizational structure to be consolidated comprises:
the selected parent node; and
all nodes in the organizational structure that are child nodes and/or descendant nodes of the selected parent node.

4. The method of claim 1, wherein:
each node in the organizational structure has a hierarchical level; and
traversing the identified path comprises traversing the hierarchical levels from lowest to highest.

5. The method of claim 4, wherein traversing the hierarchical levels from lowest to highest comprises:
selecting the lowest hierarchical level having at least one parent node;
identifying all parent nodes at the selected level;
for each identified parent node:
performing consolidation on the identified parent node by aggregating data for all nodes that are children of the identified parent node; and
associating the aggregated data with the identified parent node;
responsive to there being at least one level higher than the selected level:
selecting the next-higher level; and
repeating the identifying, performing consolidation, and associating steps; and
responsive to there being at least one level higher than the selected level, repeating the selecting and repeating steps.

6. The method of claim 1, wherein performing consolidation on a parent node concurrently with and in parallel with performing consolidation on the at least one other parent node associated with the selected level comprises:
at the hardware processing device, designating, as a current level, the lowest level having at least one parent node;
at the hardware processing device, establishing a value for a counter, the value representing the number of parent nodes at the current level; and
each time consolidation of one of the parent nodes at the current level is completed:
decrementing the value of the counter;
determining if the value of the counter equals zero; and
responsive to the value of the counter equaling zero and responsive to there existing a level that is above the current level and that has at least one parent node dependent on the current level, initiating consolidation of all parent nodes associated with the level above the current level.

7. The method of claim 6, further comprising:
responsive to the value of the counter equaling zero and responsive to there existing no level that is above the current level, ending the automatic tier consolidation.

8. The method of claim 1, further comprising:
prior to performing consolidation on the parent node:
determining whether a resource lock is active on the parent node;
responsive to the resource lock currently being active on the parent node, waiting until the resource lock has been deactivated; and
responsive to no resource lock currently being active on the parent node, activating the resource lock on the parent node; and
subsequently to performing consolidation on the parent node, deactivating the resource lock on the parent node.

9. The method of claim 1, wherein at least one parent node is a parent to at least two child nodes.

10. The method of claim 1, wherein at least one child node is a child to at least two parent nodes.

11. The method of claim 1, wherein aggregating data for each node that is a child of the parent node comprises:
determining whether at least one child node is associated with a different currency than the parent node; and
responsive to at least one child node being associated with a different currency than the parent node, performing currency conversion when performing the aggregation.

12. The method of claim 1, further comprising:
receiving input specifying a reporting period;
and wherein:
aggregating data for each node that is a child of the parent node comprises aggregating data for the specified reporting period, for each node that is a child of the parent node.

13. The method of claim 1, further comprising, prior to automatically identifying an optimal path for consolidation of at least a portion of the organizational structure, receiving input defining the organizational structure.

14. The method of claim 13, wherein receiving input defining the organizational structure comprises receiving input specifying a plurality of parent/child relationships among nodes representing entities in an organization.

15. The method of claim 1, wherein:
the organizational structure specifies at least one relationship wherein at least one parent node has partial ownership of at least one child node; and
aggregating data for each node that is a child of the parent node comprises aggregating data according to the specified partial ownership.

16. The method of claim 1, wherein the aggregated data comprises accounting data.

17. The method of claim 1, further comprising:
at the hardware processing device, prior to traversing the identified path:
determining if a lock is in place on the organizational structure; and
responsive to a lock being in place, postponing the traversal of the organizational structure until after the lock is lifted.

18. A non-transitory computer-readable medium for automatic tier consolidation for an organizational structure comprising a plurality of levels and a plurality of nodes, each node being associated with one of the levels, the medium comprising instructions stored thereon, that when performed by a hardware processor, perform the steps of:
automatically identifying an optimal path for consolidation of at least a portion of the organizational structure, the path comprising a plurality of the nodes of the organizational structure, wherein the plurality of nodes comprises at least one parent node and at least one child node, and wherein each parent node is a parent to at least one child node;

automatically identifying at least one level associated with a plurality of parent nodes;

traversing the identified path by, for each node within the path:
  automatically identifying a level associated with the node;
  determining whether the node is a parent node; and
  responsive to the node being a parent node that is associated with the same level as at least one other parent node:
    performing consolidation on the parent node by aggregating data for each node that is a child of the parent node, wherein consolidation on the parent node is performed by the hardware processor concurrently with and in parallel with performing consolidation on the at least one other parent node associated with the same level; and
    assigning the aggregated data to the parent node; and
  causing an output device to output at least one report comprising the aggregated data for at least one node.

19. The non-transitory computer-readable medium of claim 18, further comprising instructions stored thereon, that when performed by the hardware processor, perform the step of, prior to automatically identifying an optimal path for consolidation of at least a portion of the organizational structure, identifying a portion of the organizational structure to be consolidated.

20. The non-transitory computer-readable medium of claim 19, wherein:
  identifying a portion of the organizational structure to be consolidated comprises receiving input selecting a parent node within the organization structure; and
  the portion of the organizational structure to be consolidated comprises:
    the selected parent node; and
    all nodes in the organizational structure that are child nodes and/or descendant nodes of the selected parent node.

21. The non-transitory computer-readable medium of claim 18, wherein:
  each node in the organizational structure has a hierarchical level; and
  traversing the identified path comprises traversing the hierarchical levels from lowest to highest.

22. The non-transitory computer-readable medium of claim 21, wherein traversing the hierarchical levels from lowest to highest comprises:
  selecting the lowest hierarchical level having at least one parent node;
  identifying all parent nodes at the selected level;
  for each identified parent node:
    performing consolidation on the identified parent node by aggregating data for all nodes that are children of the identified parent node; and
    associating the aggregated data with the identified parent node;
  responsive to there being at least one level higher than the selected level:
    selecting the next-higher level; and
    repeating the identifying, performing consolidation, and associating steps; and
  responsive to there being at least one level higher than the selected level, repeating the selecting and repeating steps.

23. The non-transitory computer-readable medium of claim 18, wherein performing consolidation on a parent node concurrently with and in parallel with performing consolidation on the at least one other parent node associated with the selected level comprises: designating, as a current level, the lowest level having at least one parent node;
  establishing a value for a counter, the value representing the number of parent nodes at the current level; and
  each time consolidation of one of the parent nodes at the current level is completed:
    decrementing the value of the counter;
    determining if the value of the counter equals zero; and
    responsive to the value of the counter equaling zero and responsive to there existing a level that is above the current level and that has at least one parent node dependent on the current level, initiating consolidation of all parent nodes associated with the level above the current level.

24. The non-transitory computer-readable medium of claim 23, further comprising instructions stored thereon, that when performed by a hardware processor, perform the step of:
  responsive to the value of the counter equaling zero and responsive to there existing no level that is above the current level, ending the automatic tier consolidation.

25. The non-transitory computer-readable medium of claim 18, further comprising:
  prior to performing consolidation on the parent node:
    determining whether a resource lock is active on the parent node;
    responsive to the resource lock currently being active on the parent node, waiting until the resource lock has been deactivated; and
    responsive to no resource lock currently being active on the parent node, activating the resource lock on the parent node; and
  subsequently to performing consolidation on the parent node, deactivating the resource lock on the parent node.

26. The non-transitory computer-readable medium of claim 18, wherein at least one parent node is a parent to at least two child nodes.

27. The non-transitory computer-readable medium of claim 18, wherein at least one child node is a child to at least two parent nodes.

28. The non-transitory computer-readable medium of claim 18, wherein aggregating data for each node that is a child of the parent node comprises:
  determining whether at least one child node is associated with a different currency than the parent node; and
  responsive to at least one child node being associated with a different currency than the parent node, performing currency conversion when performing the aggregation.

29. The non-transitory computer-readable medium of claim 18, further comprising instructions stored thereon, that when performed by the hardware processor, perform the step of:
  causing an input device to receive specifying a reporting period;
  and wherein:
    aggregating data for each node that is a child of the parent node comprises aggregating data for the specified reporting period, for each node that is a child of the parent node.

30. The non-transitory computer-readable medium of claim 18, further comprising instructions stored thereon, that when performed by the hardware processor, perform the step of, prior to automatically identifying an optimal path for consolidation of at least a portion of the organizational structure, causing an input device to receive input defining the organizational structure.

31. The non-transitory computer-readable medium of claim 30, wherein causing the input device to receive input defining the organizational structure comprises causing the input device to receive input specifying a plurality of parent/child relationships among nodes representing entities in an organization.

32. The non-transitory computer-readable medium of claim 18, wherein:
the organizational structure specifies at least one relationship wherein at least one parent node has partial ownership of at least one child node; and
aggregating data for each node that is a child of the parent node comprises aggregating data according to the specified partial ownership.

33. The non-transitory computer-readable medium of claim 18, wherein the aggregated data comprises accounting data.

34. The non-transitory computer-readable medium of claim 18, further comprising instructions stored thereon, that when performed by a hardware processor, perform the steps of:
prior to traversing the identified path:
determining if a lock is in place on the organizational structure; and
responsive to a lock being in place, postponing the traversal of the organizational structure until after the lock is lifted.

35. A system for automatic tier consolidation for an organizational structure comprising a plurality of levels and a plurality of nodes, each node being associated with one of the levels, the system comprising:
a hardware processing device, configured to perform the steps of:
automatically identifying an optimal path for consolidation of at least a portion of the organizational structure, the path comprising a plurality of the nodes of the organizational structure, wherein the plurality of nodes comprises at least one parent node and at least one child node, and wherein each parent node is a parent to at least one child node;
automatically identifying at least one level associated with a plurality of parent nodes; and
traversing the identified path by, for each node within the path:
automatically identifying a level associated with the node;
determining whether the node is a parent node; and
responsive to the node being a parent node that is associated with the same level as at least one other parent node:
performing consolidation on the parent node by aggregating data for each node that is a child of the parent node, wherein consolidation on the parent node is performed by the hardware processing device concurrently with and in parallel with performing consolidation on the at least one other parent node associated with the same level; and
assigning the aggregated data to the parent node; and an output device, communicatively coupled to the hardware processing device, configured to output at least one report comprising the aggregated data for at least one node.

36. The system of claim 35, wherein the hardware processing device is further configured to, prior to automatically identifying an optimal path for consolidation of at least a portion of the organizational structure, identify a portion of the organizational structure to be consolidated.

37. The system of claim 36, wherein:
identifying a portion of the organizational structure to be consolidated comprises receiving input selecting a parent node within the organization structure; and
the portion of the organizational structure to be consolidated comprises:
the selected parent node; and
all nodes in the organizational structure that are child nodes and/or descendant nodes of the selected parent node.

38. The system of claim 35, wherein:
each node in the organizational structure has a hierarchical level; and
traversing the identified path comprises traversing the hierarchical levels from lowest to highest.

39. The system of claim 38, wherein traversing the hierarchical levels from lowest to highest comprises:
selecting the lowest hierarchical level having at least one parent node;
identifying all parent nodes at the selected level;
for each identified parent node:
performing consolidation on the identified parent node by aggregating data for all nodes that are children of the identified parent node; and
associating the aggregated data with the identified parent node;
responsive to there being at least one level higher than the selected level:
selecting the next-higher level; and
repeating the identifying, performing consolidation, and associating steps; and
responsive to there being at least one level higher than the selected level, repeating the selecting and repeating steps.

40. The system of claim 35, further comprising:
a counter;
wherein performing consolidation on a parent node concurrently with and in parallel with performing consolidation on the at least one other parent node associated with the selected level comprises:
designating, as a current level, the lowest level having at least one parent node;
establishing a value for the counter, the value representing the number of parent nodes at the current level; and
each time consolidation of one of the parent nodes at the current level is completed:
decrementing the value of the counter;
determining if the value of the counter equals zero; and
responsive to the value of the counter equaling zero and responsive to there existing a level that is above the current level and that has at least one parent node dependent on the current level, initiating consolidation of all parent nodes associated with the level above the current level.

41. The system of claim 40, wherein the hardware processing device is further configured to:
  responsive to the value of the counter equaling zero and responsive to there existing no level that is above the current level, end the automatic tier consolidation.

42. The system of claim 35, wherein performing consolidation on the parent node further comprises:
  determining whether a resource lock is active on the identified parent node;
  responsive to the resource lock currently being active on the identified parent node, waiting until the resource lock has been deactivated; and
  responsive to no resource lock currently being active on the identified parent node:
    activating the resource lock on the identified parent node; and
    deactivating the resource lock on the identified parent node.

43. The system of claim 35, wherein at least one parent node is a parent to at least two child nodes.

44. The system of claim 35, wherein at least one child node is a child to at least two parent nodes.

45. The system of claim 35, wherein aggregating data for each node that is a child of the parent node comprises:
  determining whether at least one child node is associated with a different currency than the parent node; and
  responsive to at least one child node being associated with a different currency than the parent node, performing currency conversion when performing the aggregation.

46. The system of claim 35, further comprising:
  an input device, communicatively coupled to the hardware processing device, configured to receive input specifying a reporting period;
  and wherein:
    aggregating data for each node that is a child of the parent node comprises aggregating data for the specified reporting period, for each node that is a child of the parent node.

47. The system of claim 35, wherein the hardware processing device is further configured to, prior to automatically identifying an optimal path for consolidation of at least a portion of the organizational structure, cause an input device to receive input defining the organizational structure.

48. The system of claim 47, wherein causing the input device to receive input defining the organizational structure comprises causing the input device to receive input specifying a plurality of parent/child relationships among nodes representing entities in an organization.

49. The system of claim 35, wherein:
  the organizational structure specifies at least one relationship wherein at least one parent node has partial ownership of at least one child node; and
  aggregating data for each node that is a child of the parent node comprises aggregating data according to the specified partial ownership.

50. The system of claim 35, wherein the aggregated data comprises accounting data.

51. The system of claim 35, wherein the hardware processor is further configured to perform the steps of:
  prior to traversing the identified path:
    determining if a lock is in place on the organizational structure; and
    responsive to a lock being in place, postponing the traversal of the organizational structure until after the lock is lifted.

* * * * *